(12) United States Patent
Lee

(10) Patent No.: US 11,301,582 B2
(45) Date of Patent: Apr. 12, 2022

(54) PERSONAL INFORMATION MANAGEMENT DEVICE, SYSTEM, METHOD AND COMPUTER-READABLE NON-TRANSITORY MEDIUM THEREFOR

(71) Applicant: SNPLab Inc., Seoul (KR)

(72) Inventor: Jae Young Lee, Seoul (KR)

(73) Assignee: SNPLab Inc., Seoul (KR)

( * ) Notice: Subject to any disclaimer, the term of this patent is extended or adjusted under 35 U.S.C. 154(b) by 0 days.

(21) Appl. No.: 15/931,528

(22) Filed: May 13, 2020

(65) Prior Publication Data

US 2021/0209245 A1    Jul. 8, 2021

(30) Foreign Application Priority Data

Jan. 6, 2020   (KR) .................. 10-2020-0001595
Feb. 28, 2020  (KR) .................. 10-2020-0025472

(51) Int. Cl.
  *G06F 3/0482*   (2013.01)
  *G06F 21/62*    (2013.01)
  *G06F 3/04883*  (2022.01)

(52) U.S. Cl.
  CPC ........ *G06F 21/6245* (2013.01); *G06F 3/0482* (2013.01); *G06F 3/04883* (2013.01); *G06F 2221/2113* (2013.01)

(58) Field of Classification Search
  CPC . G06F 21/6245; G06F 3/0482; G06F 3/04883
  See application file for complete search history.

(56) References Cited

U.S. PATENT DOCUMENTS

| | | | |
|---|---|---|---|
| 10,268,775 B2* | 4/2019 | Aad ..................... | G06F 16/901 |
| 10,452,863 B2* | 10/2019 | Miller .................. | G06F 21/62 |
| 10,521,604 B2 | 12/2019 | Miller | |
| 2002/0111816 A1* | 8/2002 | Lortscher ........... | G06Q 30/0236 |
| | | | 705/14.36 |
| 2003/0074343 A1* | 4/2003 | Onuki ................. | G06F 21/6245 |
| 2005/0228687 A1* | 10/2005 | Houtani ............... | G06F 21/645 |
| | | | 455/411 |
| 2006/0212713 A1* | 9/2006 | Hatakeda .............. | H04L 63/10 |
| | | | 713/182 |
| 2010/0088743 A1* | 4/2010 | Hayashida ............. | G06F 21/41 |
| | | | 726/1 |

(Continued)

FOREIGN PATENT DOCUMENTS

| | | |
|---|---|---|
| EP | 03477527 A1 | 5/2019 |
| JP | 2001306851 A | 11/2001 |

(Continued)

*Primary Examiner* — Yonas A Bayou
(74) *Attorney, Agent, or Firm* — Lowenstein Sandler LLP

(57) ABSTRACT

This relates to personal information management. Various embodiments disclosed herein relate to a personal information management device, a personal information management system, a personal information management method, and a computer-readable non-transitory medium that records the personal information, for example, a personal information management method based on a blockchain or by using a smart contract based on a blockchain, a portable electronic device and a system operating to manage personal information, and a computer-readable non-volatile recording medium having a computer code recorded therein, required for the personal information management.

20 Claims, 17 Drawing Sheets

(56) References Cited

U.S. PATENT DOCUMENTS

| | | | |
|---|---|---|---|
| 2010/0235922 A1* | 9/2010 | Tsusaka | G06F 21/6245 726/26 |
| 2010/0306834 A1 | 12/2010 | Grandison et al. | |
| 2011/0022247 A1* | 1/2011 | Stahlin | G08G 1/096783 701/1 |
| 2011/0152663 A1* | 6/2011 | Konuma | A61B 8/565 600/407 |
| 2013/0185206 A1 | 7/2013 | Leggett et al. | |
| 2015/0379510 A1* | 12/2015 | Smith | G06Q 20/3829 705/71 |
| 2016/0357765 A1 | 12/2016 | Kim et al. | |
| 2018/0039785 A1 | 2/2018 | Naqvi et al. | |
| 2019/0102850 A1 | 4/2019 | Wheeler et al. | |
| 2019/0205563 A1* | 7/2019 | Gonzales, Jr. | G06Q 20/42 |
| 2019/0253431 A1* | 8/2019 | Atanda | G06F 21/62 |
| 2019/0384935 A1 | 12/2019 | Miller | |

FOREIGN PATENT DOCUMENTS

| | | | |
|---|---|---|---|
| JP | 2002288025 A | 10/2002 | |
| JP | 2002334162 A | 11/2002 | |
| JP | 2003044607 A | 2/2003 | |
| JP | 2005018488 A | 1/2005 | |
| JP | 2005128953 A | 5/2005 | |
| JP | 2019219780 A | 12/2019 | |
| KR | 20100038141 A | 4/2010 | |
| KR | 20100060130 A | 6/2010 | |
| KR | 20160000565 A | 1/2016 | |
| KR | 101719198 B1 | 3/2017 | |
| KR | 20170085423 A | 7/2017 | |
| KR | 20190082150 A | 7/2019 | |
| KR | 20190126652 A | 11/2019 | |
| KR | 20200000161 A | 1/2020 | |
| WO | WO-2019032113 A1 * | 2/2019 | ....... G06Q 20/40145 |
| WO | 19180152 A1 | 9/2019 | |

* cited by examiner

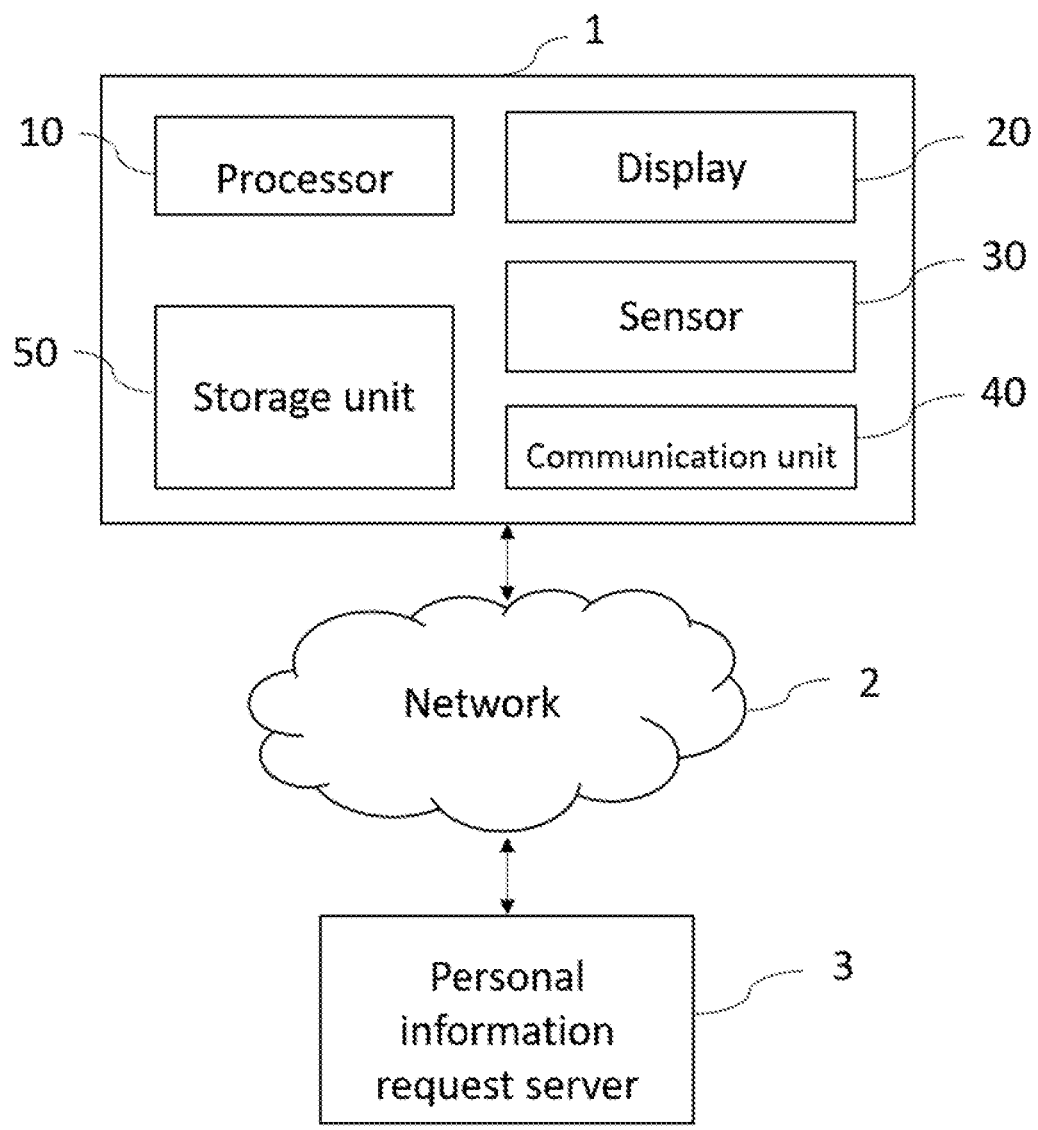
FIG. 1-a

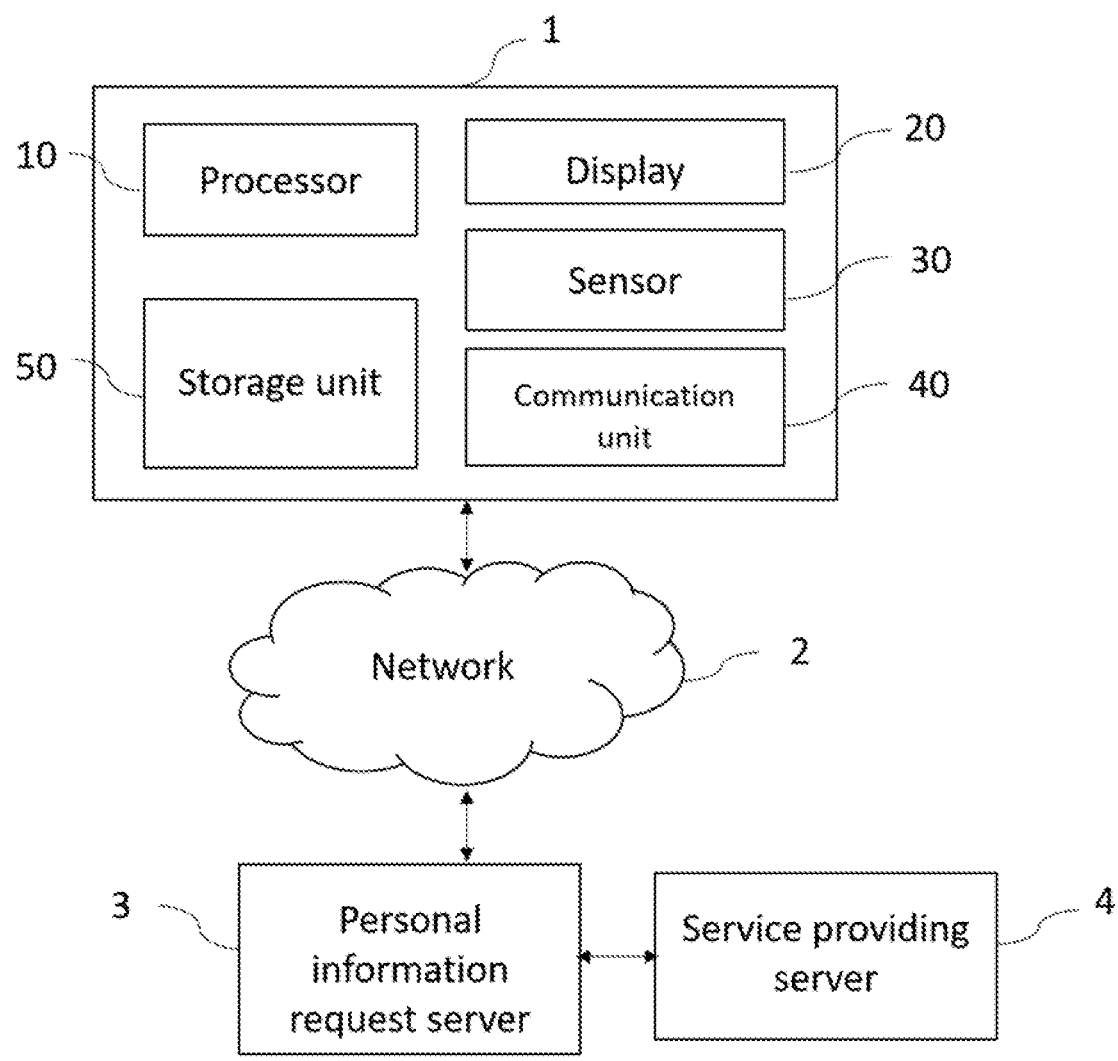
FIG. 1-b

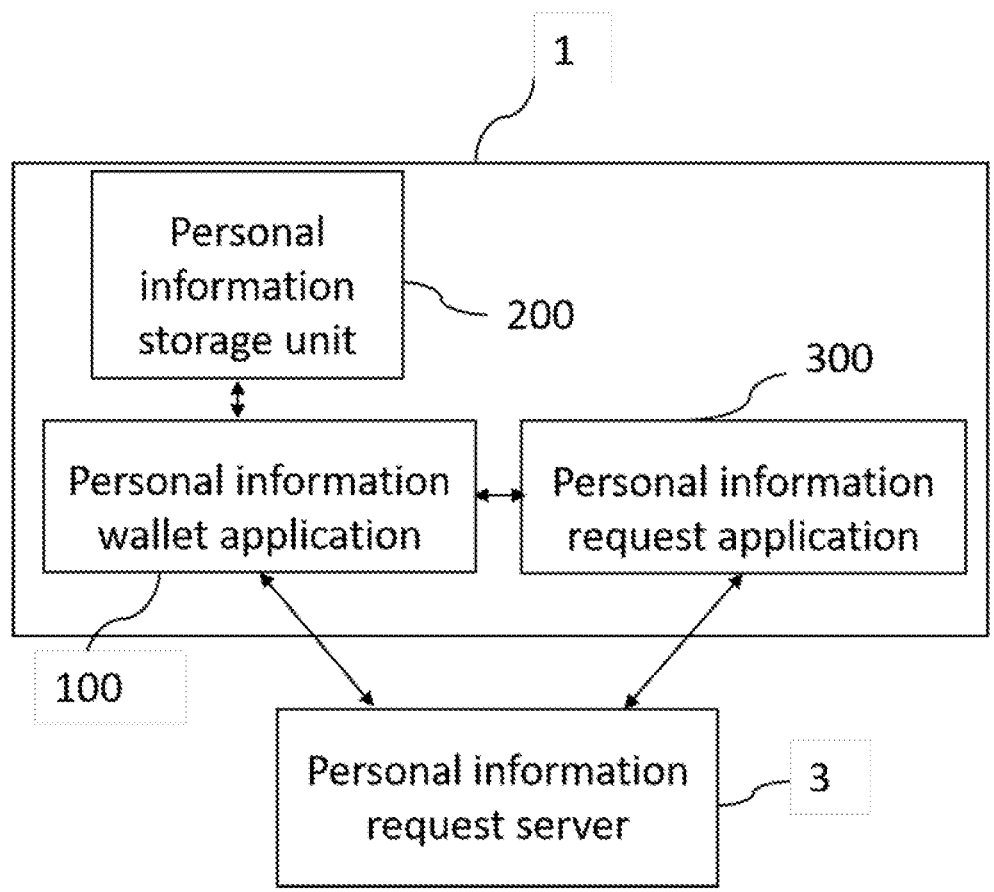
FIG. 2-a

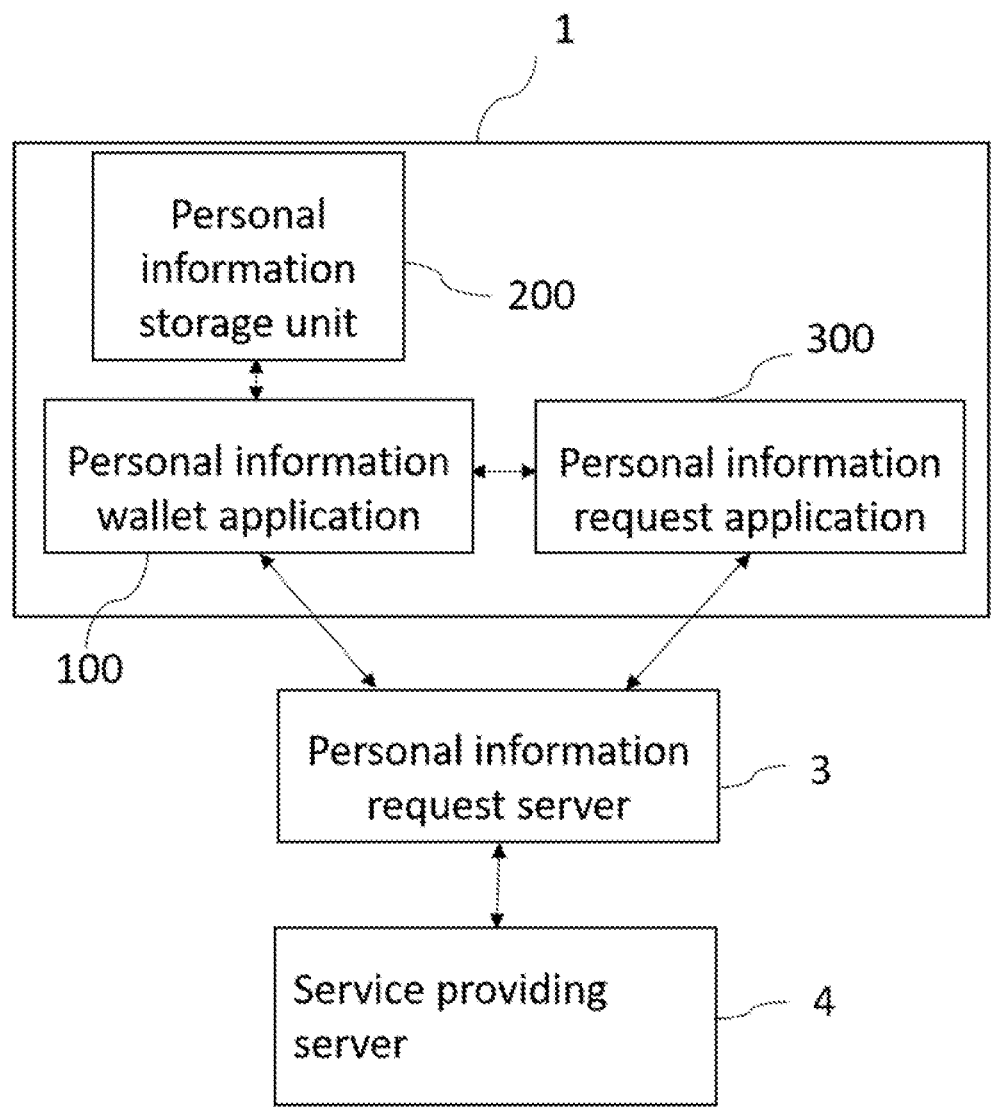
FIG. 2-b

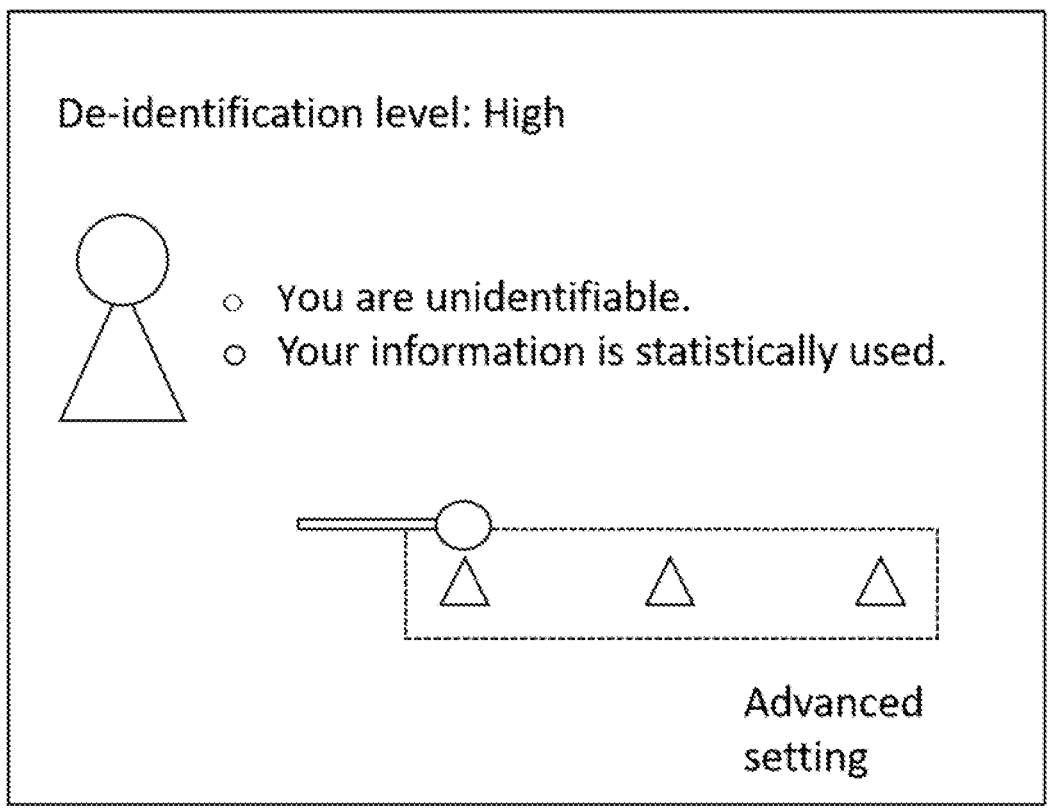
FIG. 3-a

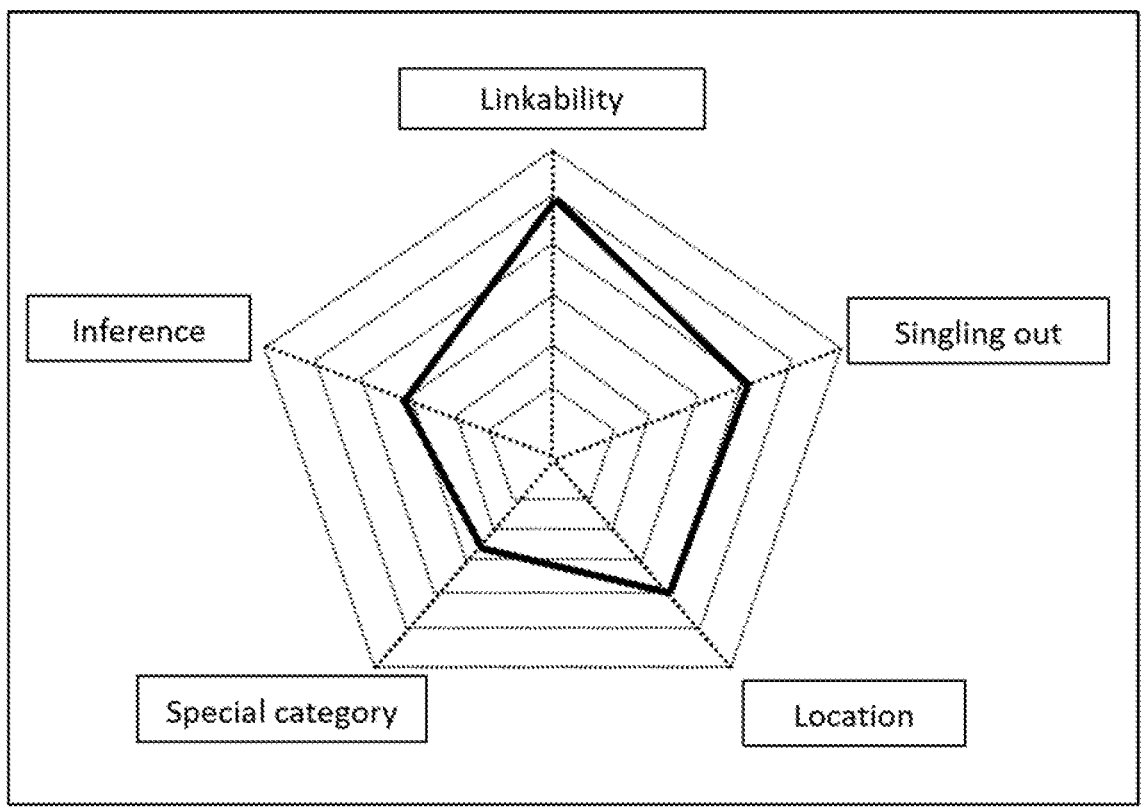
FIG. 3-b

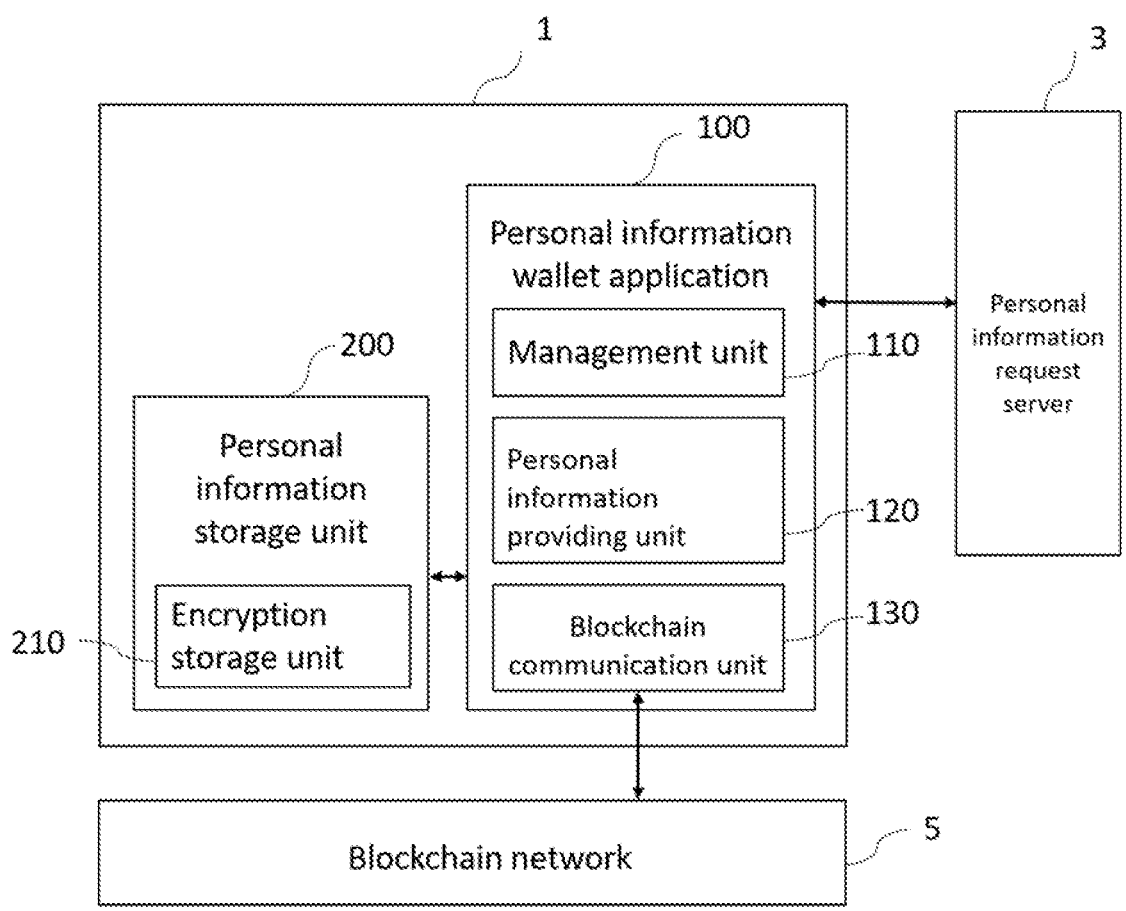
FIG. 5-a

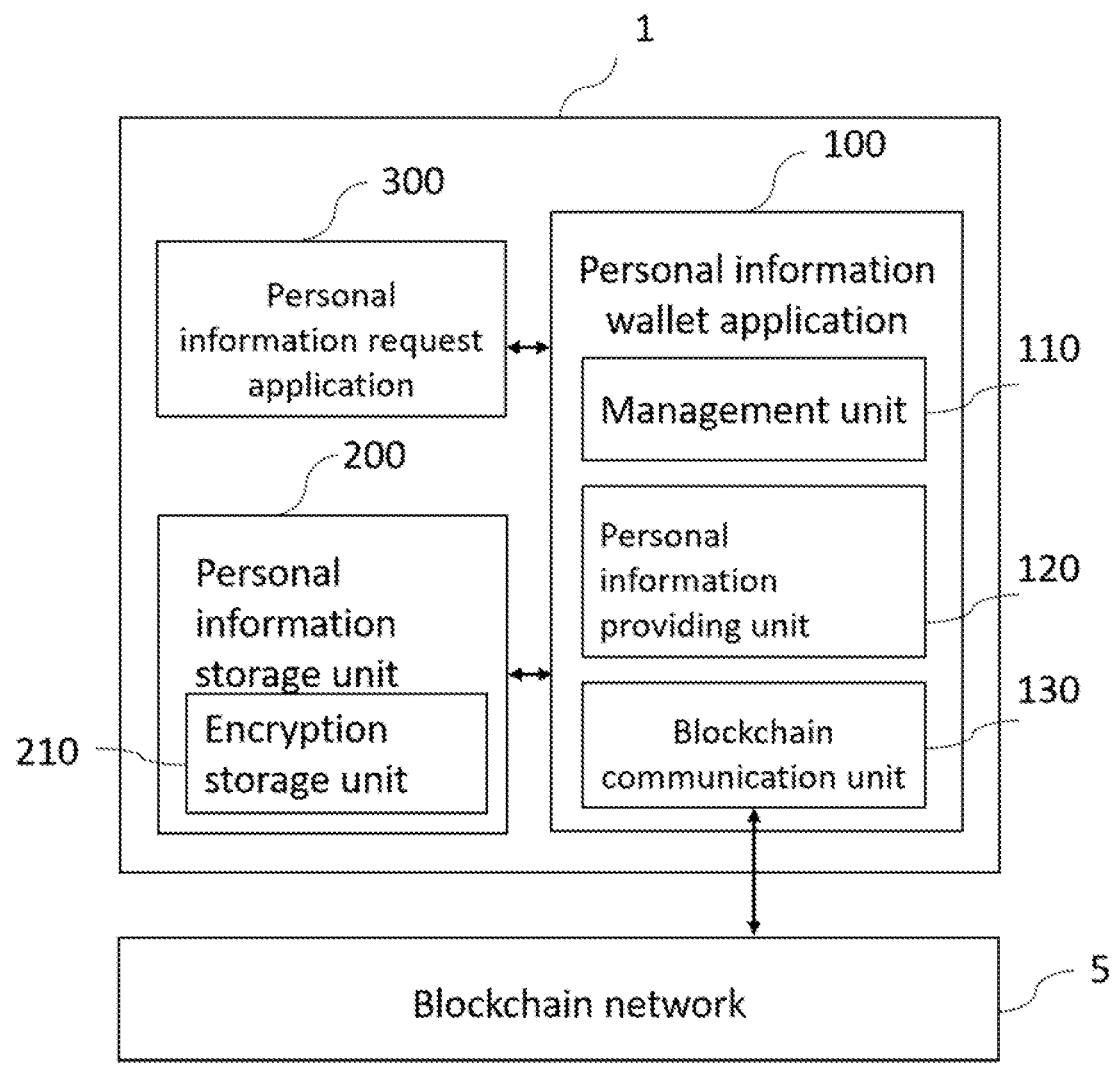
FIG. 5-b

PERSONAL INFORMATION MANAGEMENT DEVICE, SYSTEM, METHOD AND COMPUTER-READABLE NON-TRANSITORY MEDIUM THEREFOR

RELATED APPLICATIONS

This application is based upon and claims the benefit of priority from Korean Patent Application No. 10-2020-0001595, filed on Jan. 6, 2020, and Korean Patent Application No. 10-2020-0025472, filed Feb. 28, 2020, both of which are incorporated herein by reference.

TECHNICAL FIELD

This disclosure relates to personal information management. Various embodiments disclosed herein relate to a personal information management device, a personal information management system, a personal information management method, and a computer-readable non-transitory medium that stores the personal information. For example, a personal information management method based on a blockchain or using a smart contract based on a blockchain, a portable electronic device and a system operating to manage personal information, and a computer-readable non-volatile information storage medium having computer code recorded therein, required for the personal information management, are described herein.

BACKGROUND

When an individual subscribes to various services such as e-commerce, the individual delivers personal information to a service provider (e.g., an e-commerce company), and the service provider manages the received personal information using a database under its supervision. However, the service provider's collection and storage of personal information may cause a legal burden in connection with the Personal Information Protection Act etc., and the personal information collected at the time of service subscription is often not updated in a timely manner, so real-time accuracy is not guaranteed. In addition, when subscribing to/changing/unsubscribing to a service, it is inconvenient for an individual to input/modify/delete personal information one by one. More seriously, once an individual has passed his or her personal information to a service provider, it is difficult to find out where and how his or her personal information is used, and in many cases, although individual's personal information has been used for marketing purposes, the individuals cannot be rewarded for it.

Due to such situation, service users tend to disagree with the use of personal information although they subscribe to the service or tend to input only the minimum personal information required for service subscription. Accordingly, the utilization value of personal information collected by service providers is also declining.

Recently, MyData technology has attracted attention, which refers to a series of processes whereby an individual as an information owner actively manages, controls and utilizes his or her information in personal life, such as credit management, asset management, and even health care. However, conventional MyData technology is based on a frame of scraping personal information stored in databases of service providers and storing it on one or more separate servers, which still exposes a large amount of personal information to the risk of being hacked. In other words, there is a problem of lack of privacy-oriented design to protect personal information.

SUMMARY

According to one or more embodiments of the present disclosure, individuals may manage their information simply, conveniently and securely under their supervision through a privacy-oriented design. Individuals, while taking control of their personal information, may also conduct trades simply and securely with various service providers who desire to use personal information.

In addition, fast and secure personal information trades may be conducted so that up-to-dateness of personal information and real-time trades may be ensured with high transparency and reliability.

The technical objectives to be achieved with the present disclosure are not limited to the technical objectives described above, and other technical objectives that are not described herein can be clearly understood based on the following description by those skilled in the art to which the present disclosure belongs.

DESCRIPTION OF DRAWINGS

A brief description of the drawings is now provided in accordance with some embodiments.

FIGS. 1-*a* and 1-*b* are schematic block diagrams illustrating a personal information management system according to various embodiments;

FIGS. 2-*a* and 2-*b* are block diagrams for explaining an operation of the personal information management device of the personal information management system of FIGS. 1-*a* and 1-*b*;

FIGS. 3-*a* and 3-*b* illustrate an example of a screen for setting a de-identification level of personal information;

FIGS. 5-*a* and 5-*b* are block diagrams for explaining, in more detail, the personal information management device of FIGS. 2-*a* and 2-*b* according to various embodiments based on a blockchain;

DETAILED DESCRIPTION

Figure 4:
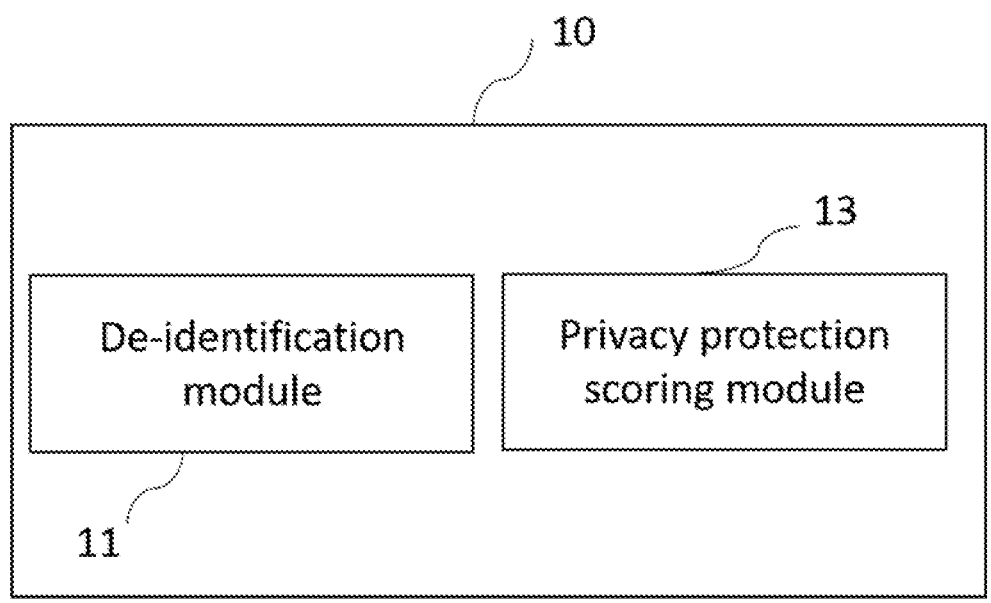
FIG. 4 is a detailed block diagram illustrating an operation module for explaining, in more detail, an operation of processing personal information by a processor according to an embodiment.

Other advantages and features of the present disclosure, and methods of achieving them will become apparent with reference to embodiments described in detail below in conjunction with the accompanying drawings. However, the present disclosure is not limited to the embodiments disclosed below but may be implemented in various forms different from one another. Embodiments are merely provided so that this disclosure will be complete and will fully convey the scope of the invention to those skilled in the art, and the present disclosure is defined only by the scope of the claims.

The terms used herein are for the purpose of describing embodiments only and are not intended to be limiting. In the present specification, the singular forms also include the plural referents, unless specifically stated otherwise in the phrase. The term 'and/or' refers to each of the listed configurations or various combinations thereof.

Meanwhile, the terms '~ portion', '~ unit', '~ block', '~ module', etc. used throughout the present specification may mean a unit for processing at least one function or operation. For example, it may mean a software, or a hardware element such as a field programmable gate array (FPGA), or an application-specific integrated circuit (ASIC). However, it does not mean that '~ portion', '~ unit', '~ block', '~ module', etc. are limited to a software or hardware. For example, '~ portion', '~ unit', '~ block', and '~ module' may be configured to be in an addressable storage medium or may be configured to play one or more processors.

Accordingly, as an example, '~ portion', '~ unit', '~ block', and '~ module' include elements such as software elements, object-oriented software elements, class elements, and task elements, processes, functions, properties, procedures, subroutines, segments of program codes, drivers, firmware, microcode, circuits, data, database, data structures, tables, arrays and variables. Elements and functions provided in '~ portions', '~ units', '~ blocks', and '~ modules' may be combined into smaller number of elements and '~ portions', '~ units', '~ blocks', and '~ modules", or may be further divided into additional elements and '~ portions', '~ units', '~ blocks', and '~ modules'.

Hereinafter, various embodiments of the present disclosure will be described in detail with reference to the accompanying drawings.

FIGS. 1a and 1b are schematic block diagrams illustrating a personal information management system according to various embodiments. Referring to FIG. 1-a, a personal information management system allows a user to manage personal information so that the user may put the personal information under the user's supervision and make a decision on the use of the personal information on his or her own, and to this end, it includes a personal information management device(s) 1 and a personal information request server 3 that are communicatively connected to each other through a network 2. The network 2 encompasses a short distance wired/wireless communication network such as Wi-Fi, Bluetooth, and local area network (LAN) and/or a long distance wired/wireless communication network such as cellular network, wired/wireless Internet, and wide area network (WAN). The personal information request server 3 requests personal information from the personal information management device 1 to receive the user's personal information or to view it in the personal information management device 1. The 'viewing' of personal information of the personal information request server 3 may be performed in various ways as long as the viewed personal information is not exported to the outside of the personal information management device 1. For example, it may be performed by transmitting program code that may be executed in the personal information management device 1 to access the personal information in the personal information management device 1. In an embodiment, not exporting to the outside of the personal information management device 1 means that the viewed personal information is not exported 'as it is', and it may be allowed to export de-identified personal information after a de-identification operation such as removing an identifier which is for identifying an individual. In another embodiment, it may mean that even de-identified personal information is not exported to the outside of the personal information management device 1. In addition, a range and/or a level of information not to be exported to the outside may vary depending on a user's usage permission range of personal information.

The personal information management device 1 is a representative for a simple and clear explanation below. However, in various embodiments, a plurality of personal information management devices exist and can be connected to the personal information request server 3. Accordingly, the personal information management device 1 may be implemented in various wired or wireless terminals, including a smartphone, a navigation terminal, a personal computer, a laptop, a tablet personal computer (PC), a wearable device (e.g., a smart watch, smart glasses, a head mounted display (HMD)), a wired and wireless broadcast receiver (e.g., smart television (TV)), an audio/video (A/V) system, digital signage, and the like. In particular, when the personal information management device 1 is implemented in a portable electronic device—a smart phone, a tablet PC, a wearable device, etc.—the accuracy and real-time characteristics of the personal information itself is ensured, and it is more convenient to manage personal information anytime and anywhere, such that privacy of personal information and its management may be further protected. Especially these days a smart phone has been becoming a must for daily life in many ways, so when the personal information management device 1 is implemented in a smart phone, it is much more convenient for the user as the user carries around the smart phone in hand all the time.

According to an embodiment, the personal information management device 1 includes a processor 10, a display 20, a sensor 30, a communication unit 40, and a storage 50. In response to the request from the personal information request server 3, the processor 10 allows viewing of personal information in the personal information management device 1 in accordance with the usage permission range that is set by the user of the personal information management device 1, and allows personalized information corresponding to the viewed personal information to be displayed on the display 20. Additionally, or alternatively, the processor 10 transmits, to the personal information request server 3, personal information that is prepared to be appropriate for the usage permission range set by the user, and allows customized service information corresponding to the transmitted personal information to be displayed on the display 20.

The customized information may be provided directly from the personal information request server 3 which is operated by the service provider (including an entrusted server operator) or may be processed and obtained by the personal information management device 1 based on the information provided from the personal information request server 3.

In an embodiment, the personal information request server 3 is operated by those who run a personal information management business or those who have been commissioned by the service provider to request and manage personal information. In such a case, the personal information request server 1 simply stays as an intermediary for personal information, the subject who actually utilizes the personal information in the business becomes a third party (e.g., service provider), and the customized information is provided from the third-party service provider. A more detailed description of the personal information management system having such a structure will be described below with reference to FIGS. 1-*b*.

Meanwhile, naming as the 'personal information request' server 3 is merely based on the fact that it plays a role of a counterpart who requests personal information from the personal information management device 1 and does not necessarily mean only those who conduct or act on behalf of personal information management businesses. In other words, the personal information request server 3 may be operated by those who perform a more efficient and customer-oriented service business utilizing the personal information. In such a case, the customized information may also be provided from the personal information request server 3. In addition, the personal information request server 3 does not mean only one physical server but may be implemented in a plurality of servers distributed in a network.

The processor 10 performs various data processing or operations by executing program codes and controls the display 20, the sensor 30, the communication unit 40, and/or the storage unit 50. The program codes include an operating system, a middleware and/or an application program. In an embodiment, the program code may be implemented with one or more programs. The processor 10 may include a main processor (e.g., central processor or application processor), and a sub-processor (e.g., graphic processor and signal processor) that may be operated independently or together with the main processor. The sub-processor may be implemented to use lower power than that of the main processor, or to be specialized in a designated function. Part of functions of the processor 10 may be separated, and additionally or alternatively, may be implemented in part of the display 20, the sensor 30, the communication unit 40, and/or the storage unit 50, and in such a case, an implementation scheme encompasses a software and/or hardware approach.

The display 20 is implemented as a touch screen display to support touch interactions so that the user of the personal information management device 1 may directly input personal information through one or more touch/gesture inputs or may set a usage permission range for personal information. To this end, the display 20 may include a circuit for sensing touch or gesture (including changes in pressure by touch). In inputting personal information and/or setting the usage permission range, it is obvious that other input/output tools (e.g., keyboard, button, mouse, electronic pen, speaker, microphone) which are not illustrated in the personal information management device 1 may be utilized independently or in combination with the touch/gesture interactions.

The sensor 30 senses an operation state (e.g., power, temperature) of the personal information management device 1 or external environment (e.g., touch, pressure, illuminance, or user state), and creates a signal or a data value corresponding to the sensed state. The sensor 30 may include at least one of, for example, an image sensor, a touch sensor, a gesture sensor, a sound sensor, a gyro sensor, an air pressure sensor, a magnetic sensor, an acceleration sensor, a grip sensor, a proximity sensor, a color sensor, an infrared (IR) sensor, a biometric sensor, a temperature sensor and a humidity sensor. The sensor 30 may be used for various notifications related to inputting, viewing, and using of personal information.

The storage 50 includes a volatile memory and/or a non-volatile memory, and stores not only program codes and data to be executed by the processor 10 but also various information or data created by other elements of the personal information management device 1, for example, the display 20, the sensor 30 and/or the communication unit 40, or received from other elements or the outside. In particular, the storage 50 stores personal information of the user who uses the personal information management device 1. The stored user's personal information may be directly input by the user or may be received from the outside. In an embodiment, at least part of the personal information is retrieved as MyData from various service providing servers through the network 2, and the user may input or update only the personal information other than the received MyData. It is also possible for the user to input personal information first, and then MyData is retrieved for updating.

Referring to FIG. 1-*b*, a personal information management system includes a personal information management device 1, a network 2, and a personal information request server 3, which is similar to that of FIG. 1-*a*, and further includes a service providing server 4. Herein, the personal information management device 1, the network 2, and/or the personal information request server 3 which perform substantially the same role as those in FIG. 1-*a* will be given the same reference numerals in FIG. 1-*b*, and repeated descriptions will be omitted.

The service providing server 4 is operated by a service provider (including commissioned server operators). Just like the personal information management device 1, the service providing server 4 is a representative for a simple and clear explanation below. In various embodiments, a plurality of service providing servers exist and can be connected to the personal information request server 3 and/or the personal information management device 1. Accordingly, services offered through service providers encompass all services available online, including e-commerce, finance and insurance. According to an embodiment, the service providing server 4 is operated by another, separately from the personal information request server 3. In such a case, the subject who views personal information stored in the personal information management device 1 or receives the personal information from the personal information providing device 1 is the personal information request server 3 rather than the service providing server 4. The personal information request server 3 'views' the personal information in the personal information management device 1. The personal information request server 3 requests, from the service providing server 4 through the network 2, a predetermined or tailored information based on the viewed personal information or received personal information. The service providing server 4 transmits the requested predetermined information to the personal information request server 3 and/or the personal information management device 1. In an embodiment, the predetermined or tailored information transmitted from the service providing server 4 to the personal information request server 3 and/or the personal information management device 1 means personalized information to be shown to the user through the personal information management device 1. For example, the personal information request server 3 views 'suffer from rhinoplasty sequelae and want a revision surgery' out of personal information and only requests information about 'rhinoplasty sequelae and revision surgery' from the service providing server 4 without identifier information. As such, the service providing server 4 cannot specify the user of the personal information management device 1 because only information necessary for a service (e.g. marketing) is simply provided with identifier information deleted or de-identified. Furthermore, since the personal information management device 1 does not directly send a request to the service providing server 4, and the requested information is also not directly transmitted from the service providing server 4 to the personal information management device 1, it is difficult for the service providing server 4 to specify the user of the personal information management device 1 and thus identify an individual who requested the information. In another embodiment, the personal information request server 3 may transmit a de-identified personal information 'career women in her 30s living in Seoul' to the service providing server 4 and receive a corresponding customized information 'perfume list preferred by career women in her 30s living in Seoul' from the service providing server 4 to send it to the personal information management device 1.

In another embodiment, if the service providing server 4 requests collection of personal information for 'revision rhinoplasty' from the personal information request server 3 in order to identify a group of individuals who wants 'revision rhinoplasty', the personal information request server 3 views 'want revision rhinoplasty' out of the personal information stored in the personal information management device 1, pseudonymizes the viewed personal information to eliminate identifier information, and then transmits, to the service providing server 4, the pseudonymized personal information indicating that this is 'an individual who wants revision rhinoplasty', or in a case where the user of the personal information management device 1 permits transmission of personal information, the personal information request server 3 transmits, to the service providing server 4, the personal information with the identifier information indicating that this is 'an individual who wants revision rhinoplasty'.

In an embodiment, the customized information is generated based on predetermined service information transmitted from the service providing server 4 to the personal information request server 3 or the personal information management device 1. In the above example, the personal information request server 3 may receive, in advance, from the service providing server 4, information about 'sequelae of plastic surgery and revision surgery' as information of an upper category including 'rhinoplasty sequelae and revision surgery', then extract information about 'sequelae of plastic surgery and revision surgery', and transmit it as customized information to the personal information management device 1.

The personal information management device 1 processes personal information in accordance with the usage permission range of personal information. In an embodiment, personal information is processed so that an individual of the personal information is unidentifiable, the service providing server 4 cannot find out the identity of the individual from the personal information, and thus privacy of the individual is protected. A detailed description of a method of processing personal information in accordance with a usage permission range of personal information will be described below.

FIGS. 2-*a* and 2-*b* are block diagrams for explaining an operation of the personal information management device 1 of the personal information management system of FIGS. 1-*a* and 1-*b*. Referring to FIGS. 2-*a* and 2-*b*, a personal information management device 1 includes a personal information wallet application 100, a personal information storage 200, and a personal information request application 300. In an embodiment, the personal information wallet application 100 and the personal information request application 300 are implemented in program code, stored in the storage 50 of FIGS. 1-*a* and 1-*b*, and executed by the processor 10. The personal information storage 200 is physically located in the storage 50 of FIGS. 1-*a* and 1-*b* and is substantially the same as the storage 50 in terms of its function, but it is distinctly considered and named in the software point of view to describe operations in relation to the personal information wallet application 100. The personal information storage 200 may be a storage space that can be used exclusively by the personal information wallet application 100 or may be a storage space that can be shared with other program code of the personal information management device 1.

The personal information wallet application 100 and/or the personal information request application 300 may be a native application (app) installed in the personal information management device 1 from the production or may be installed by the user of the personal information management device 1. Installation may be performed in various ways, but it is usually downloaded through the network 2 from the App Store and installed. Since the personal information wallet application 100 may be independently made and provided in various versions to be installed in portable electronic devices that support various operating systems, it may be installed in various portable electronic devices manufactured by different manufacturers, to perform personal information management described below, and thus it is advantageous that various users having different devices may manage personal information. In an embodiment, when the personal information wallet application 100 and the personal information request application 300 are installed, corresponding app icons are each displayed on the display 20, and the user may easily start the applications through touch interaction on the app icons. It is obvious that installation and execution of the personal information wallet application 100 and the personal information request application 300 are also possible in other schemes.

The personal information wallet application 100 is generally implemented in an application, as its name suggests, but at least part of the personal information wallet application 100 may be implemented as part of the operating system and/or middleware or may perform its function by exchanging information or collaborating through interactions with the operating system and/or middleware, where needed. The personal information wallet application 100 may also be implemented in a single program or may be implemented as a collection of a plurality of programs to perform its function(s). At least part of the personal information wallet application 100 may be implemented in hardware circuits to perform its function(s).

A user may create an account in the personal information wallet application 100. In an embodiment, the user generates a key pair (secret key+public key) through the personal information wallet application 100 and then registers the created public key in the personal information wallet application 100 to make an account of the user. To this end, the personal information wallet application 100 may include a key pair creation module. It is also possible that in other embodiments, the user may create an account by inputting quasi-identifiable information such as his/her date of birth, age, address, region, and the like or inputting identifiable information such as unique ID, certificate, email address, biometric information, and the like.

The user may register his or her personal information in the personal information wallet application 100. Personal information includes (i) identifiable information (e.g., social security numbers, phone numbers, email addresses, etc.) including identifiers, with which it is possible to identify individuals, (ii) quasi-identifiable information (e.g., date of birth, age, address, region, etc.) with which it is difficult to identify individuals immediately but it is possible to relatively easily identify individuals by combination, and/or (iii) attribute information (e.g., hobbies, search terms, app/Youtube history, annual income, shopping information, etc.) including privacy information such as personality and characteristics. The registered personal information is stored in the personal information storage 200 by the personal information wallet application 100. According to an embodiment, after the personal information wallet application 100 encrypts the personal information input by the user and stores it in the personal information storage 200, it may allow only the user who has passed the user authentication to retrieve, view, modify and/or download the personal information stored in the personal information storage 200. A user authentication level and scheme may be implemented in various ways, and depending on its level, the authority for personal information allowed to the user may vary. For example, it may be implemented in such a manner that only retrieving or viewing is allowed for a user who has passed a low-level user authentication (e.g., password), and downloading is allowed only for a user who passed a higher level user authentication (e.g., password+biometric combination).

The personal information wallet application 100 serves as a platform to allow users of the personal information management device(s) 1, while keeping their personal information under their management, to perform personal information trades with various service providers who are willing to provide customized services utilizing personal information. The personal information request application 300 requests personal information from the personal information wallet application 100 independently or in response to a request from the personal information request server 3 and/or the service providing server 4. In response to the request, the personal information wallet application 100 allows the personal information request application 300 to 'view' personal information. Viewing personal information means that the personal information is only provided in the personal information management device 1 and it is not exported out of the personal information management device 1. In other words, the personal information wallet application 100 retrieves the personal information stored in the personal information storage unit 200, or processes the retrieved personal information, to transmit it to the personal information request application 300, but the personal information request application 300 does not transmit it to the personal information request server 3 or the service providing server 4 outside the personal information management device 1. Instead, the personal information request application 300 may request and receive a predetermined service information corresponding to the retrieved personal information from the personal information request server 3 or the service providing server 4.

In another embodiment, when the request of the personal information request application 300 to the personal information wallet application 100 is made in response to a request from the personal information request server 3 and/or the service providing server 4, the personal information wallet application 100 retrieves personal information stored in the personal information storage 200, or processes the retrieved personal information, to transmit it to the personal information request application 300, and the personal information request application 300 transmits the received personal information to the personal information request server 3 or the service providing server 4, located outside the personal information management device 1, subject to the usage permission range that is set by the user. Alternatively, personal information may be transmitted directly from the personal information wallet application 100 to the personal information request server 3 or the service providing server 4, subject to the usage permission range that is set by the user. In addition, the personal information request server 3 or the service providing server 4 may directly request personal information from the personal information wallet application 100.

In an embodiment, the personal information wallet application 100 or the personal information request application 300 receives, from the personal information request server 3 or service providing server 4, customized information to be provided to the personal information management device 1 and shown to the user. For example, the personal information request application 300 views 'suffer from rhinoplasty sequelae and want a revision surgery' as privacy information out of the personal information, and then requests information about 'rhinoplasty sequelae and revision surgery' from the service providing server 4 via the personal information request server 3. Similarly, since the information about 'rhinoplasty sequelae and revision surgery' is transmitted to the personal information request application 300 via the personal information request server 3, the service providing server 4 may not identify the user of the personal information management device 1 and may not identify the individual who requested the information.

In another embodiment, when the service providing server 4 requests the personal information request server 3 and/or the personal information request application 300 to collect personal information of individuals who want "revision rhinoplasty' to identify a group of individuals who wants 'revision rhinoplasty', the personal information request application 300 views 'want revision rhinoplasty' out of personal information through the personal information wallet application 100 and then transmits, to the personal information request server 3 and/or the service providing server 4, pseudonymized personal information without identifier information indicating that this is 'an individual who wants revision rhinoplasty', or in a case where the user of the personal information management device 1 permits transmission of identifier information, the personal information request application 300 transmits, to the personal information request server 3 and/or the service providing server 4, the personal information with the identifier information indicating that this is 'an individual who wants revision rhinoplasty'. As an intermediary, the personal information request server 3 may transmit, to the service providing server 4, the pseudonymized personal information without identifier information or the personal information with the identifier information which indicate that this is 'an individual who wants revision rhinoplasty'.

In another embodiment, the personal information request application 300 may transmit a de-identified personal information 'career women in her 30s living in Seoul' to the service providing server 4, and receive a corresponding customized service information 'perfume list preferred by career women in her 30s living in Seoul' from the service providing server 4. In another embodiment, the customized information is created based on a predetermined information transmitted from the service providing server 4 to the personal information request server 3 or the personal information request application 300. In the above example, the personal information request server 3 may receive, in advance, from the service providing server 4, information about 'sequelae of plastic surgery and revision surgery' as information of an upper category including 'rhinoplasty sequelae and revision surgery', then extract information about 'sequelae of plastic surgery and revision surgery', and transmit it as customized information to the personal information request application 300, when needed. Additionally or alternatively, the personal information request application 300 may receive, in advance, from the service providing server 4, information of an upper category including 'rhinoplasty sequelae and revision surgery', then extract information about ' sequelae of plastic surgery and revision surgery' to generate customized information.

The personal information provided to the personal information request application 300, the personal information requesting server 3 and/or the service providing server 4 is prepared by the processor 10 subject to the usage permission range that is set by the user. In order to set the usage permission range, the processor 10 outputs, on the display 20, a setting screen for the user to input categories of personal information, an service provider(s) to be provided with personal information, and/or a de-identification level of personal information.

FIGS. 3-a and 3-b illustrate an example of a screen for setting a de-identification level of personal information. Referring to FIG. 3-a, the setting screen is provided so that the user may set the de-identification level of personal information with a plurality of classified levels, such as high/middle/low. When it is set to 'high', as illustrated in the drawings, the processor 10 processes the personal information so that the user is unidentifiable. For example, information such as social security numbers and phone numbers with which an individual is identifiable is deleted or some numbers or letters are made invisible like 'career women in her 30s living in Seoul' so that the individual is unidentifiable. Such de-identified personal information may only be used statistically in marketing and the like.

Referring to FIG. 3-b, the setting screen is provided based on categories of personal information or evaluation criteria for evaluating personal information. The categories of personal information may include, for example, general information, family information, employment information, unique identifiable information, education information, vehicle information, real estate information, hobby information, and/or communications information. The general information is usually quasi-identifiable information, such as name, age and address, with which in combination an individual is identifiable. Sensitive information may be privacy information such as attributes or characteristics of an individual and may include login information, medical information, legal information, military service information, income information, credit information, physical information and/or authentication information. The categories of personal information may be organized horizontally or may be organized to have more than two levels of hierarchy. Evaluation criteria may include, for example, linkability, singling out characteristics, inference possibility, special category, and location. Linkability refers to a criterion for evaluating how much linkability the provided personal information has with other disclosed personal information. For example, information, such as Google identifier (ID) international mobile equipment identifier (IMEI)-based app usage history, and advertising (AD) ID, that is used while the device is in use and serves as a hub for collecting lots of information is highly scored. The singling out characteristics show how much singling out characteristics the personal information itself has. For example, identifier information, such as social security number, telephone number, email address, and the like, with which an individual is identifiable is highly scored. The inference possibility is an evaluation criterion that indicates the level of how identifiable a user is based on combinations of provided personal information. For example, quasi-identifier information, such as age, occupation, location information, etc., with which in combination an individual may be relatively easily identified is highly scored. The special category is privacy information, such as attributes and characteristics of an individual and refers to sensitive personal information (e.g., health information, credit information, religion, political orientation). For example, according to one standard, personal information with high linkability is provided to the service provider after a linker is deleted so that the user is unidentifiable through linking with other information, and personal information corresponding to the sensitive category (e.g., military service history) that may reveal privacy of individuals may be provided to the service provider to be used for statistics only, when an identifier is deleted or when processed with inference prevention so that the user cannot be inferred. The user may set the de-identification level of personal information for each personal information category or may set the de-identification level of personal information for each service provider. The de-identification level of personal information may be set for each item of personal information, with various criteria by period (e.g., high de-identification level for only one year, low after one year), by number of uses (e.g., block after 10 times of use, completely allowed etc.), and the like. It is also adjustable by the user.

The processor 10 may output, on the display 20, an interface through which the user may check, at any time, which personal information is set to be de-identified, which service providers are to be provided with the de-identified personal information, and which de-identification level is set for de-identification. For example, in the case of a service provider 1 (application #1), it may be displayed that the de-identification level is set low and that it is set such that health information of the user belonging to the special category, for example, age and health status, may be provided to the service provider 1 (application #1). In the case of a service provider 2 (application #2), it may be displayed that the de-identification level is set high and that it is set such that location information and credit card information may be provided to the service provider 2 (application #2). For quick and intuitive understanding, lighter colored items may mean that the de-identification level is set relatively low and darker colored items may mean that the de-identification level is set relatively high. Similarly, even in the case of the same color, it may mean that the de-identification level is low if the transparency or chroma is low, and the de-identification level is high if the transparency or chroma is high.

The processor 10 performs verification to determine whether the service provider who requested personal information through the personal information request server 3 and/or the personal information request application 300 is a user proper to the usage permission range set by the user (and/or whether the proper information is requested), and allows the service provider to use the information only after passing the verification. Verification may be done in various schemes. For example, the verification may be conducted by a trusted third party, and verification using encryption technology is also possible.

In an embodiment, the processor 10 takes part in forming a smart contract on condition of the usage permission range of personal information set by the user—categories of personal information, information on one or more coyservice providers to be provided with personal information, and a de-identification level of personal information. A smart contract is a set of promises in digital form, which may be defined as including a protocol for parties to fulfill their commitments by the promises, the conditions of the contract are coded in digital form and embedded in hardware or software, and the contract may be automatically executed when conditions are met. Accordingly, when personal information is requested from the personal information request server 3 and/or the personal information request application 300, in a case where verification of the request (who requested what information and for what purpose) is completed, thereby confirming that the execution condition of the personal information smart contract is satisfied, the requested information may be provided quickly without additional work or delay.

A detailed description of the implementation of the smart contract will be described below along with the blockchain. The implementation of smart contracts is not necessarily inseparable from the blockchain, but the use of blockchain ensures higher transparency of smart contracts.

In an embodiment, in processing of personal information, the processor 10 processes the personal information stored in the storage 50 in accordance with the usage permission range of personal information that is set by the user through the setting screen described above. The storage 50 stores various kinds of personal information. In an embodiment, the personal information includes identifier data, privacy data, and non-privacy data. The processor 10 may de-identify personal information that includes an identifier to process it into pseudonymized data. For example, since an electronic device value allocated to and stored in the personal information management device 1 may itself be personal information having an identifier, at least part of the electronic device value may be deleted to process it into pseudonymized data through a pseudonymizationing module. Further, the processor 10 may de-identify privacy information in processing it into anonymized data. For example, location information recorded in a smart phone, which serves as the personal information management device 1, is privacy information and may be de-identified in being processed into anonymous data.

The personal information processing may be performed at any time after the user sets the usage permission range of personal information, but it may be desirable to process the personal information in advance for faster information transmission. As an example, the processor 10 may process personal information whenever there is a margin in processing power (e.g., automatically performed when having idle of 30% or more of a power). In order to ensure the accuracy or up-to-dateness of the information, it is also possible to process only the requested personal information immediately after the personal information is requested.

FIG. 4 is a detailed block diagram illustrating an operation module for explaining, in more detail, an operation of processing personal information by the processor 10 according to an embodiment. Referring to FIG. 4, the processor 10 includes a de-identification module 11 and a privacy protection scoring module 13. In an embodiment, each module may be implemented in program code and executed by the processor 10 to process personal information.

The de-identification module 11 de-identifies personal information using personal information de-identification technology. As used herein, de-identification encompasses operations of processing data to prevent inference of who the user is in various schemes, such as deleting an identifier or pseudonymization to make the user unidentifiable, as well as linking to other data. In an embodiment, the de-identification module 11 may de-identify information that includes an identifier (e.g., a user identifier) by deleting or replacing the user identifier. The information that includes an identifier refers to personal information (e.g., social security number and email) with which itself the user is identifiable. For de-identification, for example, at least part of one or more telephone numbers is replaced by random values, or privacy information (e.g., browsing cookies) created by the user is deleted or de-identified to make the user unidentifiable.

More specifically, the de-identification may be performed by using at least one of pseudonymization, aggregation, data reduction, data suppression, data masking, or differential privacy, but it is not necessarily limited thereto.

Pseudonymization is a method of changing the name of a data subject to another name, which may include Heuristic pseudonymization to replace values corresponding to identifiers according to a predetermined rule, encryption of the values corresponding to identifiers using an algorithm with a predetermined rule, or swapping of the values corresponding to identifiers with a predetermined external variable value.

Aggregation refers to processing numerical values of a plurality of identifiers by a sum or an average value of the values. Aggregation includes aggregation for aggregating the entire personal information, micro aggregation for aggregating only certain part of personal information, rounding that applies a rounding standard (e.g., rounding up, rounding down) for the aggregated values, or rearrangement for rearranging data so that individuals are not identifiable while maintaining the existing information value.

Data reduction includes deleting all or part of an identifier or deleting all identification elements along with the identifier. Data suppression refers to the conversion of a certain value of an identifier into a specific range. For example, it may include hiding in which a certain value is converted into an average or a category value; or random rounding in which a certain value is rounded up or down.

Data masking refers to processing of making some values of an identifier invisible. For example, the identifier may be replaced with a replacement character (e.g., *) or a space, or any number or symbol may be added. Differential privacy intentionally inserts non-deterministic noise into data to make the individual unidentifiable. The differential privacy, for example, adds noise to each of result values of processing an information set including personal information and an information set not including personal information, so that the distribution of the result values has a difference of a certain level or less.

The privacy protection score module 13 compares a quantified risk level according to a de-identification level of personal information that is set by the user with a quantified risk level of actual de-identified personal information. This score shows, in numerical value, the likelihood that the user is identifiable from the de-identified personal information after de-identification is performed, that is, the relationship between the risk that the user may actually be identified or inferred and the de-identification level of personal information set by the user. The higher the de-identification level set by the user, the less likely the user is to be identified through de-identified personal information. However, even though de-identification is made, an actual risk that an individual may be identified may have a value different from that of the risk that is predicted based on the de-identification level of personal information set by the user, depending on the type of personal information, de-identification scheme, and already disclosed personal information. Accordingly, there is a need to compare the actual risk with the predicted risk and to adjust the degree of de-identification. If the risk of de-identified personal information is higher than the predicted risk according to the de-identification level of personal information set by the user, the de-identification module 11 may perform an additional reprocessing to meet the de-identification level of personal information set by the user. On the contrary, if the risk of de-identified personal information is lower than the predicted risk, reprocessing does not need to be performed on the already de-identified personal information.

FIGS. 5-*a* and 5-*b* are block diagrams for explaining, in more detail, the personal information management device 1 of FIGS. 2-*a* and 2-*b* according to various embodiments based on a blockchain.

Blockchain, which is an innovative concept that ensures the integrity and reliability of trade information without a trusted third party, refers to a digital distributed ledger—digitized and stored in the unit of 'block'—in which the same copy of the ledger is stored on multiple computers. A 'block' is divided into a body and a header, trade details are stored in the body, and an encryption code is stored in the header. 'Blocks' are distributed and stored on nodes of blockchain network participants, and when a new trade occurs or existing trades change, a new block is created and connected to the existing blocks in chronological order, and these connections continue like a chain.

The operational structure of the distributed ledger is determined, automated, and operated by a predetermined consensus algorithm, and each of all network participants keeps the entire ledger and jointly updates it to reflect a new trade. Accordingly, even if the trade information is damaged or falsified in a block stored by some participants, since the corresponding information is intactly present in the remaining blocks, it may be easily identified and restored, and thus the data determined to be stored in the block by the consensus algorithm is stored permanently, alteration is not possible, and the data is highly transparent because trade tracking is easy as it is accessible to all participants in principle. Accordingly, in managing personal information according to various embodiments of the present disclosure by utilizing distributed ledgers managed by each blockchain node, both of an individual, as an information provider, and an information user (mainly a company) may safely participate in personal information trades. In an embodiment, the personal information management device 1, the personal information request server 3 and/or the service providing server 4 become blockchain participants connected by a blockchain network 5.

The blockchain is used not only to keep trade records such as personal information owner, personal information usage time, the number of times, personal information user, etc., but also to store the usage conditions of personal information, contract details, contract conclusion, contract execution, contract change status, etc. in each block, and thus it is used as a means to conclude and execute contracts in a state where the risk of storage error or external manipulation is eliminated. As such, highly reliable verification on whether the execution condition of the smart contract is satisfied is possible, and thus a smart contract may be executed immediately upon satisfying the condition for using personal information.

A usage right of personal information is an authority to use personal information of a user, which is granted by the user and is acquired by an service provider who wants to use the personal information. When the usage permission range of the user and a request for use of the service provider coincide with each other, it is regarded that a contract for the use of personal information is concluded, and the use of personal information according to the agreement is regarded as an execution of the contract. In an embodiment, the trade for the right to use the personal information is implemented based on a smart contract. The conditions of personal information usage, as conditions for concluding the smart contract, may be created based on the user's usage permission range and/or the details of the service provider's request for personal information usage. For example, the conditions of personal information usage become the conditions for concluding a smart contract, and when the conditions are satisfied, a contract is concluded, and the use of the personal information is executed.

The usage voucher (ticket) is issued by the user upon the request of a service provider or independently. 'Issuance' of the usage voucher refers to an offer of a contract and is in a status before an acceptance of the offer is reached. In other words, an issued usage voucher does not mean the conclusion of a contract, and there should be an acceptance for the issued usage voucher before the contract is concluded and executed. As its name suggests, a service provider can use personal information by presenting the usage voucher. However, as will be described below, in order to clarify the right of decision of the user as the owner of the personal information, even though there is an acceptance for the issued usage right, the contract may be executed, i.e., the service provider may use the personal information, after a process of confirmation by the owner of the personal information.

In an embodiment, the personal information wallet application 100 allows the user to set a usage permission range through the above-described setting screen and issues a usage right (as digital data) including usage conditions determined within the set range. The issued usage right may include, for example, available categories of personal information, a de-identification level and/or service provider information, as usage conditions. In another embodiment, in a case where the category of personal information and the de-identification level are indicated but there are no restrictions on service providers, anyone may use the personal information. Period of use, the number of times of use, purpose of use, etc. may be added to the usage conditions. In an embodiment, the purpose of using personal information may be classified into basic functions, marketing, statistical processing, research, user profiling, and personalized advertisement, and one usage right may be implemented to have one or more purposes. In practice, the usage conditions may be indicated in various combinations if it is not out of the user's usage permission range. For example, although the user set the period of use of one year, the personal information wallet application 100 may issue two usage rights with a period of use of six months in consideration of characteristics of the category, the de-identification level, the service provider, and the like of the target personal information. In the case of low-level de-identification or sensitive personal information, it is possible to issue a usage right for a short period of time (e.g., hours, a day, a week, a month, etc.). It is also possible to determine the period of use, reflecting the credit ratings of the service providers.

In another embodiment, the usage right (ticket) may be issued by a service provider. The issued usage right may include, for example, categories of personal information to use, target user information, and/or a target address as usage conditions. The target user information refers to information about target individuals whose personal information is desired to be viewed or to collect, and in an embodiment, it may be indicated as 'age twenty to thirty (general information), 1 owned vehicle (vehicle information), Master's degree or higher (education information)'. The target address refers to a destination of the request for personal information, and in an embodiment, when it is to be viewed in a user terminal, the target address is indicated as the name of the personal information request application 300 having the authority to view, and when the personal information is to be delivered to the personal information request server 3 and/or the service providing server 4, it is indicated as its IP address. Period of use, the number of times of use, purpose of use, etc. may be added to the usage conditions. The descriptions of an embodiment described above regarding the period of use, the number of times, the purpose of use, and the like may be applicable here. However, the usage conditions may be determined by various combinations of items desired by service providers (mainly service providers) who want to use the personal information.

Referring to FIG. 5-a, the personal information wallet application 100 installed in the personal information management device 1 includes, in the view of operating functions, a management unit 110, a personal information providing unit 120, and a blockchain communication unit 130. In an embodiment, the management unit 110 of the personal information wallet application 100 may create an offer on condition of the usage permission range of personal information that is set by the user and present it to the personal information request server 3. The offer may specify a service provider who may use personal information or may include it as category information. In an embodiment, the category information may include the type, region, size, history, credit rating, and the like of the service business. The personal information request server 3 may transmit a declared intention of acceptance of the offer to the management unit 110. The declared intention of acceptance includes information about the user who wants to use the personal information. The management unit 110 may notify the user of the personal information management device 1 that the declared intention of acceptance has arrived. In an embodiment, the management unit 110 may display a small pop-up window and further display detailed information upon touch (click) of the user. In another embodiment, the management unit 110 causes a color (including luminance, chroma, brightness, lightness, transparency) and/or a shape of an icon of the personal information wallet application 100 to be changed or causes the icon to move. In particular, such a notification may be displayed while it is determined that the user is staring at the display 20, and detailed information may be displayed when the user touches (clicks) or stares at the icon.

In another embodiment, the management unit 110 of the personal information wallet application 100 may receive an offer for using personal information from the personal information request server 3. In the offer, personal information to use and an service provider who wants to use the personal information may be specified. The management unit 110 may notify the user of the personal information management device 1 that the offer has arrived. In an embodiment, the management unit 110 may display a small pop-up window and further display detailed information when the user touches (clicks). The above description about the user notification may also apply here. In addition, the management unit 110 may transmit a declared intention of acceptance of the offer of the user to the personal information request server 3. The above description related to the scheme of declaring the user's intention through a screen touch or the like may also apply here.

When a contract is concluded by offer and acceptance, the service provider may use personal information. In another embodiment, although the acceptance has been reached or delivered, the management unit 110 allows the contract to be concluded after the user goes through a confirmation process again for the offer or the acceptance. The contract is implemented in a smart contract based on blockchain. Conditions for concluding a smart contract is indicated as the usage conditions of personal information presented by the user or the service provider, and when both parties agree, the smart contract is concluded. Although the smart contract is implemented, it may be implemented such that the smart contract may be executed after a user's confirmation process in addition to the offer and acceptance.

In an embodiment, the offer of the smart contract is issued in the form of a digital usage right (ticket). The blockchain communication unit 130 transmits the usage right issued by the management unit 110 to the blockchain network 5 so that the blockchain participants, and particularly the service provider, may see it. The service provider who recognizes the usage right delivered to the blockchain network 5 may deliver a declared intention of acceptance, that is, the intention to purchase the usage right, to the management unit 110 through the blockchain network 5 and/or the blockchain communication unit 130. When the intention to purchase the usage right is delivered, the management unit 110 notifies the user of this. The above description of the notification scheme and the contract conclusion are all applicable here.

A service provider who wants to use personal information may also send an offer for using personal information to the personal information wallet application 100 through the personal information request server 3. In an embodiment, the offer of the service provider is issued in the form of a digital usage right (ticket) and transmitted to the blockchain network 5 so that blockchain participants, and in particular the personal information wallet application 100 and/or the personal information request server 1 and/or the personal information request application 300, may see it. The management unit 110 of the personal information wallet application 100 allows the blockchain communication unit 130 to filter and retrieve only the usage right information that matches the personal information stored in the personal information storage unit 200 out of usage rights delivered to the blockchain network 5. The management unit 110 notifies the user of matching usage right information (i.e., a service provider's request for using personal information). The above description of notification scheme and contract conclusion are all applicable here. The meaning that the smart contract is concluded is that the usage right issued by the personal information wallet application 100 is purchased by the service provider, or that the user of the personal information management device 1, the owner of personal information, permits the use of the usage right (request for personal information use) issued by the service provider, such that the service provider may use the personal information by presenting the usage right afterwards. Meanwhile, the fact that the smart contract is concluded is transmitted to the blockchain network 5 through the blockchain communication unit 130 and recorded in the corresponding block.

The management unit 110 receives usage-right-issuance request information or approval request information for the usage right issued by the service provider, and checks if a usage right corresponding to the received usage-right-issuance request information or the approval request information for the usage right issued by the service provider has been already issued and exists. In an embodiment, it is checked whether a corresponding usage right is stored in the personal information storage unit 200 in which previously issued usage rights are stored or an encryption storage unit 210 in which they are encrypted and stored.

The usage right corresponding to the approval request information refers to a usage right whose conditions for using the usage right (conditions for executing smart contract) such as a usage permission range of personal information (e.g., category information), period of use, the number of times, purpose of use, etc. meet a usage request range of personal information included in the usage-right-issuance request information or the approval request information for the usage request issued by the service provider. Such a usage right allows the service provider to use the personal information of the user as desired, subject to the approval of the user. In an embodiment, if only part of the conditions for using the usage right are satisfied by the usage-right-issuance request information or the approval request information for the usage right issued by the service provider, the service provider may be asked whether to accept the remaining conditions through the personal information request server 3 or the blockchain network 5. In another embodiment, the management unit 110 may inquire as to an intention of the user, the owner of the personal information, whether the remaining conditions can be changed to correspond to the usage-right-issuance request information or the approval request information for the usage right issued by the service provider. The above-described notification scheme of the offer and/or acceptance and/or providing the detailed information may be applicable, as it is or with appropriate modification, to the scheme of inquiring about the intention.

If it is determined that the usage right corresponding to the request does not exist, the management unit 110 issues a new usage right. For issuance, the management unit 110 requests the user to issue a usage right through the above-described notification scheme and/or detailed information providing scheme. In an embodiment, the management unit 110 may display a screen requesting the user to input his or her signature on the display 20. When a signature is input by user's touch, click, biometric information (e.g., fingerprint, iris) input, signature file attachment, digital authentication or the like, the management unit 110 issues a new usage right based on the usage permission range that is set by the user. In another embodiment, in a case where a user has already set a usage permission range, and if a usage right may be issued within the range according to the usage-right issuance request information, a new usage right may be issued, without requesting the user to issue a usage right again.

In a case where the usage permission range of personal information is not set in advance, the management unit 110 may display the setting screen on the display 20 and guide the user with a usage permission range corresponding to the usage-right-issuance request information, thus helping prompt a decision of the user. The guide information is displayed on the setting screen or on an additional screen. In an embodiment, if categories of personal information (and/or sub-items) and check boxes for selection are displayed on the setting screen, check boxes for selecting categories of personal information corresponding to the usage-right-issuance request information may be checked with selection marks in deactivation in advance, and if the user actually checks the checkbox, the selection mark may be activated.

The newly issued usage rights may be delivered to and used by the service provider who have requested to issue them. Information about the newly issued usage right and trade information are also transmitted to the blockchain network 5 through the blockchain communication unit 130 and recorded in the corresponding block.

In addition, the management unit 110 requests approval from the user through the above-described notification scheme and/or detailed information providing scheme to request approval of the user on the usage right issued by the service provider. In a case where the usage permission range for personal information is not set in advance, the above description may also apply as it is. The user's approval is delivered to the service provider who requested the approval, and the usage right may be utilized to use personal information. Information on the newly approved usage right and trade information are also transmitted to the blockchain network 5 through the service provider and/or the blockchain communication unit 130 and recorded in the corresponding block.

Referring to FIG. 5-*b*, the personal information management device 1 is provided with the personal information request application 300 in addition to the personal information wallet application 100. Herein, the personal information wallet application 100, the functional blocks, and the blockchain network 5 which perform substantially the same role as those in FIG. 5-A are given the same reference numerals, and repeated description thereof will be omitted. The personal information request application 300 exchanges information with the personal information wallet application 100 and performs substantially the same role as that in FIGS. 2-*a* and 2-*b*, and accordingly, the same reference numerals are given and repeated description thereof will be omitted. However, the personal information request application 300 may communicate with the blockchain network 5 to perform the above-described usage right trades through smart contracts implemented based on the blockchain. In an embodiment, the personal information request application 300 displays information transmitted from the service providing server 4 based on interaction with the user. For example, by pairing with the service providing server 4 operated by an e-commerce company to perform a client-server communication and to receive commerce information, commerce information (personalized information) prepared according to the user's personal information may be displayed on the display 20.

In addition, the personal information request application 300 transmits, to the personal information wallet application 100, the information transmitted from the service providing server 4 and/or the blockchain network 5. For example, information about the personal information usage right (ticket) issued by the service provider may be received from the service providing server 4 or retrieved from the blockchain network 5 to transmit it to the personal information wallet application 100.

Figure 6:
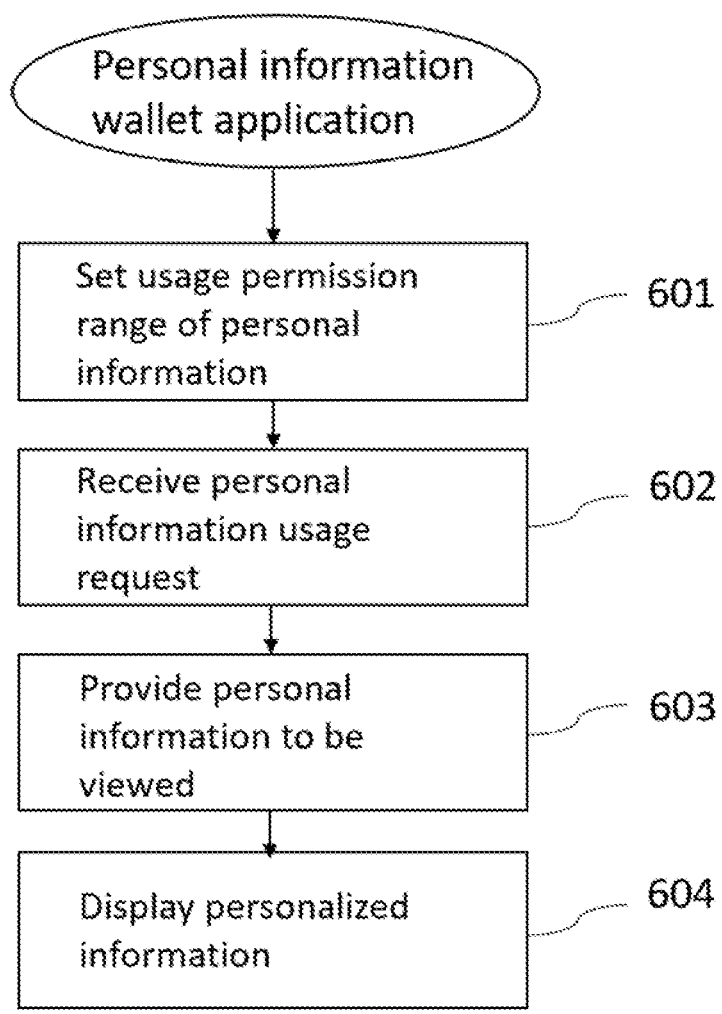
FIG. 6 is a flowchart illustrating a representative operation of a personal information wallet application installed in a personal information management device according to various embodiments.

FIG. 6 is a flowchart illustrating a representative operation of the personal information wallet application 100 installed in the personal information management device 1 according to various embodiments. Referring to FIG. 6, the personal information wallet application 100 receives a touch input to the display 20 from the user and sets a usage permission range of personal information based on the touch input (601). When a request for using the personal information is received (602), the personal information may be viewed in the personal information management device 1 according to the set usage permission range of personal information (603). The setting of the usage permission range (601) may be performed in a manner, for example, that after receiving the personal information usage request (602), at least part of the personal information usage request is permitted. Next, personalized information corresponding to the viewed personal information is displayed on the display 20 (604).

Figure 7:
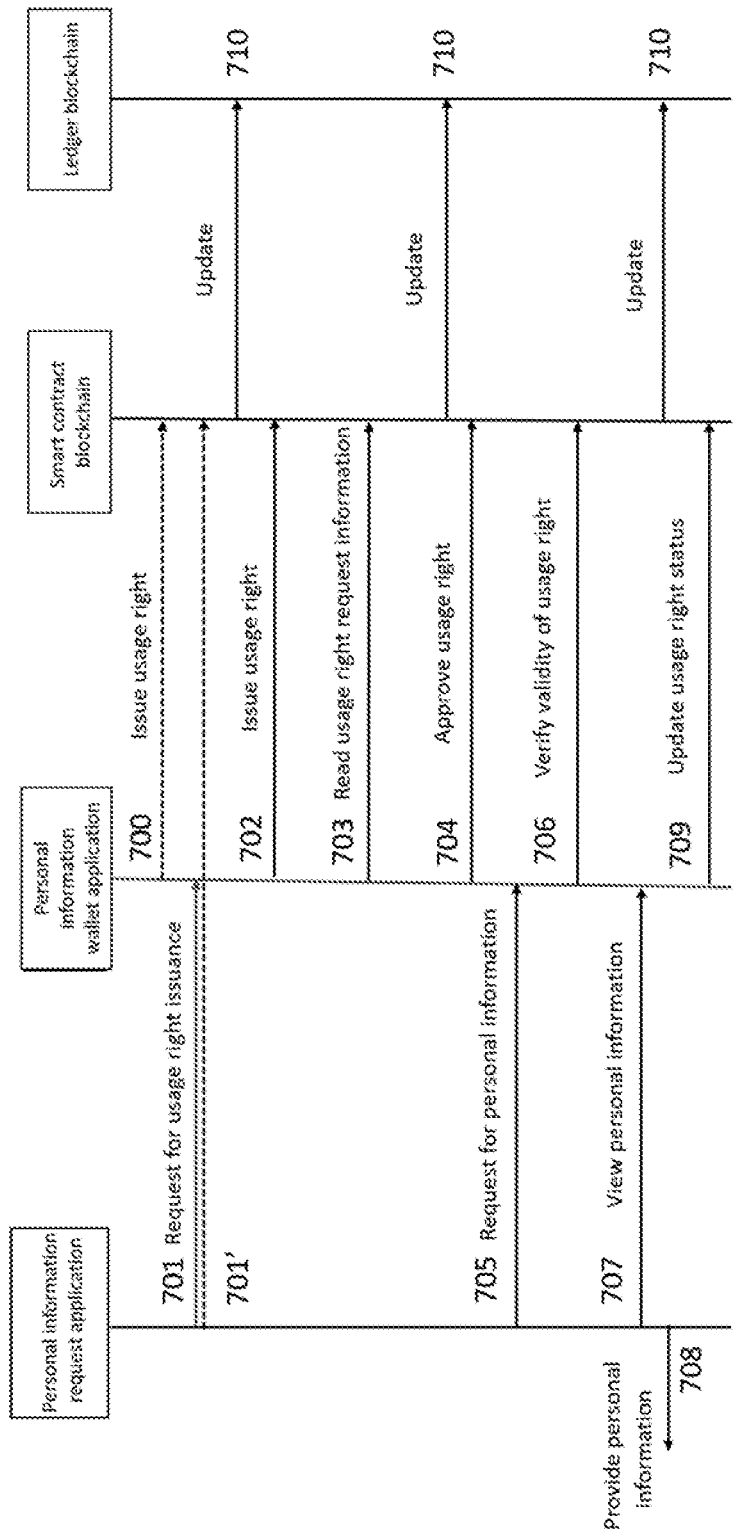
FIG. 7 is a reference view for explaining an operation of a personal information wallet application for implementing a personal information trade through a blockchain-based smart contract.

FIG. 7 is a reference view for explaining an operation of the personal information wallet application 100 for implementing a personal information trade through a blockchain-based smart contract. The personal information wallet application 100 may create a smart contract and transmit it to the blockchain, and in a case where there is a request for personal information corresponding to the smart contract, the personal information wallet application 100 may transmit, to the blockchain, the personal information that is processed based on the set de-identification level of personal information. Referring to FIG. 7, in an embodiment, the personal information wallet application 100 issues a usage right to use personal information and transmits it to the smart contract blockchain (700). Issuing a usage right may be considered as creating a smart contract, but at this stage, the smart contract corresponds to an offering status before the contract is concluded. In other words, the issued usage right contains conditions for using personal information as conditions for concluding the smart contract. The usage right may indicate available categories of personal information, period of use, the number of times of permitted use, purpose, and/or reward (price). Meanwhile, in order to use the personal information, the personal information request application 300 requests issuance of a usage right from the personal information wallet application 100 (701) or sends a usage-right-issuance request to the smart contract blockchain (701'). The usage-right-issuance request information may include categories of personal information to use, target user information, target address, period of use, the number of times of use, purpose, and/or reward (desired price). When the usage-right-issuance request is received from the personal information request application 300 (701), the personal information wallet application 100 issues a usage right based on the usage-right-issuance request and transmits it to the smart contract blockchain (702).

Further, the personal information wallet application 100 retrieves the usage right request information from the smart contract blockchain (703). In an embodiment, the usage right request information may be a personal information usage right (ticket) issued by a service provider. The personal information usage right may include categories of personal information to use, target user information, target address, period of use, the number of times of use, purpose, and/or reward (desired price). The personal information wallet application 100 may filter and retrieve only the usage right request information or the personal information usage right issued by the service provider that corresponds to the usage permission range of personal information. The filtering is performed based on a target user information that defines a category of owner of personal information included in the usage right request information or the personal information usage right issued by the service provider. If the target user information is empty, it is regarded as a usage right request information targeting all personal information owners. The personal information wallet application 100 approves the issued usage right or the personal information usage right issued by the service provider that correspond to the requested information (704). The usage right may be approved by a signature of the owner of the personal information, that is, the user of the personal information management device 1. The personal information request application 300 presents the approved, issued usage right and requests personal information from the personal information wallet application 100. The presentation of the usage right may be made by sending an ID number of the usage right.

The personal information wallet application 100 verifies validity of the presented usage right (706). Herein, validation refers to a procedure in which whether the personal information may be used as recorded in the usage right when the usage right is presented is checked by checking whether the usage right has been issued by the user, has been approved by the user, has not expired, and/or has been withdrawn. In an embodiment, validation is performed by checking a usage right status information (e.g., expiration date, whether withdrawn) through the smart contract blockchain. The blockchain communication unit 130 of the personal information wallet application 100 transmits a user signature information to the blockchain network 5 and receives a validation result in response thereto. Additionally, or alternatively, validity may be verified by checking the usage issuance, approval, and/or status information recorded in the Ledger blockchain. In another embodiment, in a case where the personal information wallet application 100 has a valid usage right list, validity may be verified by checking the list. The valid usage right list may be implemented to be updated in real time through communication with the smart contract blockchain. When the validity of the usage right is verified, the personal information wallet application 100 allows the personal information request application 300 to view the personal information (707) or provide the personal information to be transmitted to the outside (708). The personal information may be provided in the form of a message or may be provided in the form of being retrieved in a terminal through a one-time token that opens the personal information storage unit 200. When the provision of personal information according to the personal information usage permission is completed, the personal information wallet application 100 updates the usage right status (709). The usage right status update is performed by recording subtraction of the number of usage and contents of usage (who used what information for what purpose) on the smart contract blockchain. Meanwhile, the smart contract blockchain frequently updates the Ledger blockchain (710).

In an embodiment, the personal information wallet application 100 may provide the user with a reward in relation to using personal information after the provision of personal information is completed. For reward, the personal information wallet application 100 may communicate with the personal information request server 3 or the service provider server 4 and may, for example, provide an insurance plan for which the user is an insured.

Further, the personal information wallet application 100 allows a selection button for extending the period of use of the usage right to be displayed on the display 20 or provides a notification before the usage right expires. In an embodiment, the notification may be made through an app icon of the personal information wallet application 100. The above-described notification scheme and/or detailed information providing scheme are also applicable.

Figure 8:
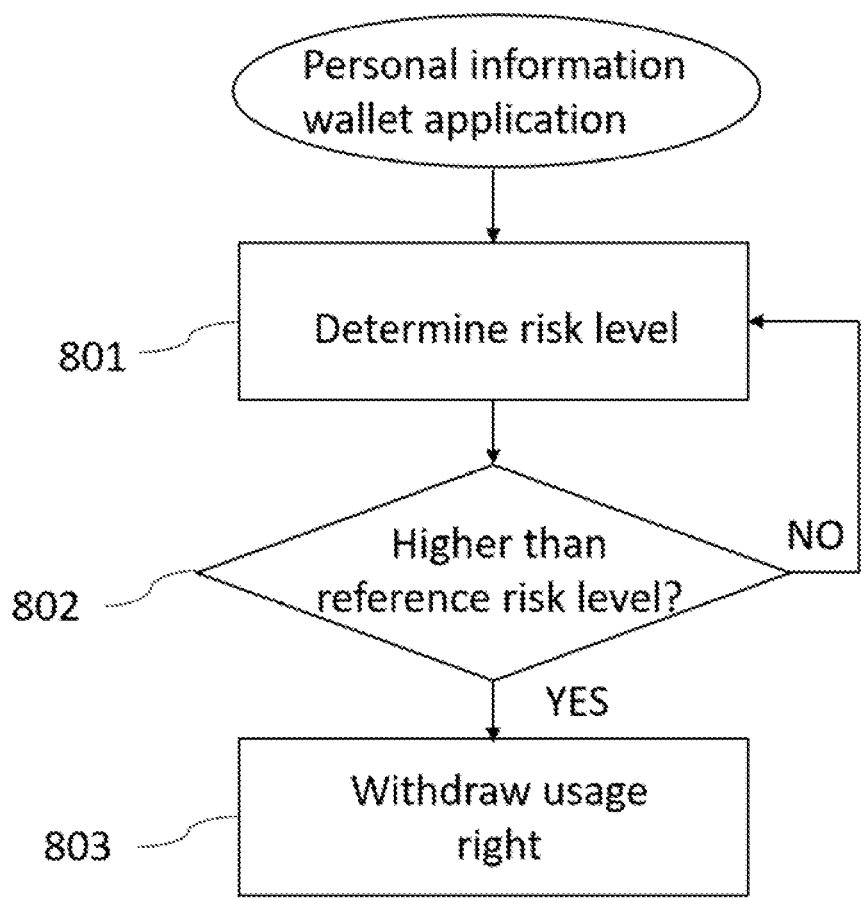
FIG. 8 is a flowchart illustrating an embodiment of an operation of a personal information wallet application related to a risk level.

FIG. 8 is a flowchart illustrating an embodiment of an operation of the personal information wallet application 100 related to a risk level. Referring to FIG. 8, the personal information wallet application 100 periodically determines a risk level even for the issued usage rights of which the period of use is not expired or the number of times of use is not exceeded currently (801). In an embodiment, the risk level may be determined based on categories of personal information, purpose of use, and/or the number of times of use included in the usage right. Further, it may be determined based on the usage-right-issuance request information received from the outside or the personal information usage conditions included in the personal information usage right issued by the service provider. In another embodiment, it may also be determined based on the utilization status of used personal information.

If the determined risk level exceeds a reference risk level (802), the usage right is withdrawn (803). The withdrawing of the usage right may be performed in various schemes. In an embodiment, the personal information wallet application 100 notifies the blockchain network 5 that the usage right is no longer valid. In addition, the personal information wallet application 100 deletes the withdrawn usage right from the valid, issued usage right list managed by the personal information wallet application 100 and updates the list, while notifying the personal information request server 3, the personal information request application 300, and/or the service providing server 4 that the usage right is no longer valid. In addition, the personal information wallet application 100 notifies the user that the usage right has been withdrawn. The above-described notification scheme and/or detailed information providing scheme may also be applicable here. In addition to the case where the withdrawing condition is satisfied, the usage right may be withdrawn by the user's choice in another embodiment.

Figure 9:
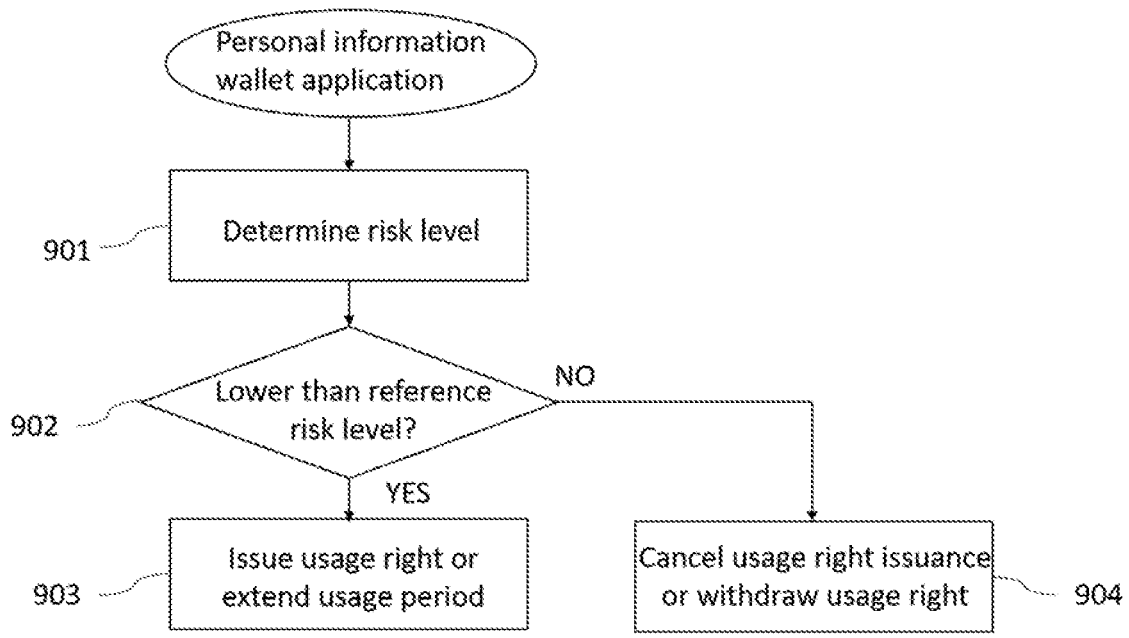
FIG. 9 is a flowchart illustrating another embodiment of an operation of a personal information wallet application related to a risk level.

FIG. 9 is a flowchart illustrating another embodiment of an operation of the personal information wallet application 100 related to a risk level. Referring to FIG. 9, when a usage right issuance request is received, the personal information wallet application 100 determines a risk level of the usage right issuance request or determines a risk level of a valid, issued usage right (901). Herein, the risk level may be determined based on risks that may result from the use of personal information according to the usage right issuance request, that is, requested category of personal information, purpose of use, and/or the number of times of use. Further, the risk level may be determined based on risks that may result from the use of personal information with the valid, issued usage right, such as permitted category of personal information, purpose of use, and/or the number of times of use. In another embodiment, it may also be determined based on the utilization status of used personal information.

If the determined risk level is equal to or lower than the reference risk level (902), the requested usage right is issued or the period of use of the existing valid and issued usage right is extended (903). Issuance of a usage right or extension of the period of use may be carried out in various schemes. In an embodiment, the personal information wallet application 100 notifies the blockchain network 5 that a new usage right has been issued and transmits the issued usage right information to the blockchain network 5 or notifies the blockchain network 5 that the period of use of the usage right is extended. In addition, the personal information wallet application 100 updates the valid and issued usage right list managed by the personal information wallet application 100 to reflect that the period of use of the corresponding usage right has been extended, while notifying the personal information request server 3, the personal information request application 300 and/or the service providing server 4 that the period of use of the corresponding usage right has been extended. In addition, the personal information wallet application 100 notifies the user that the period of use of the corresponding usage right has been extended. The above-described notification scheme and/or detailed information providing scheme may also be applicable here.

If the determined risk level is higher than the reference risk level (902), a plan for issuing the requested usage right is canceled, or if it has been already issued, the issued usage right is canceled to prevent further procedures (approval, verification, etc.) from proceeding (904). Further, the existing issued right is withdrawn (904). The cancellation and withdrawal of a usage right may be performed in various schemes. In an embodiment, the personal information wallet application 100 notifies the blockchain network 5 that the issued usage right is cancelled or the issued usage right is withdrawn. In addition, the personal information wallet application 100 deletes the withdrawn usage right from the valid and issued usage right list managed by the personal information wallet application and updates the list. The scheme described above in FIG. 8 is also applicable here.

In another embodiment, instead of canceling or withdrawing the usage right, the usage permission range included in the usage right may be reduced or limited. The reduced or limited content is transmitted to the blockchain network 5 and/or to the personal information request server 3, the personal information request application 300 and/or the service provision server 4.

Figure 10:
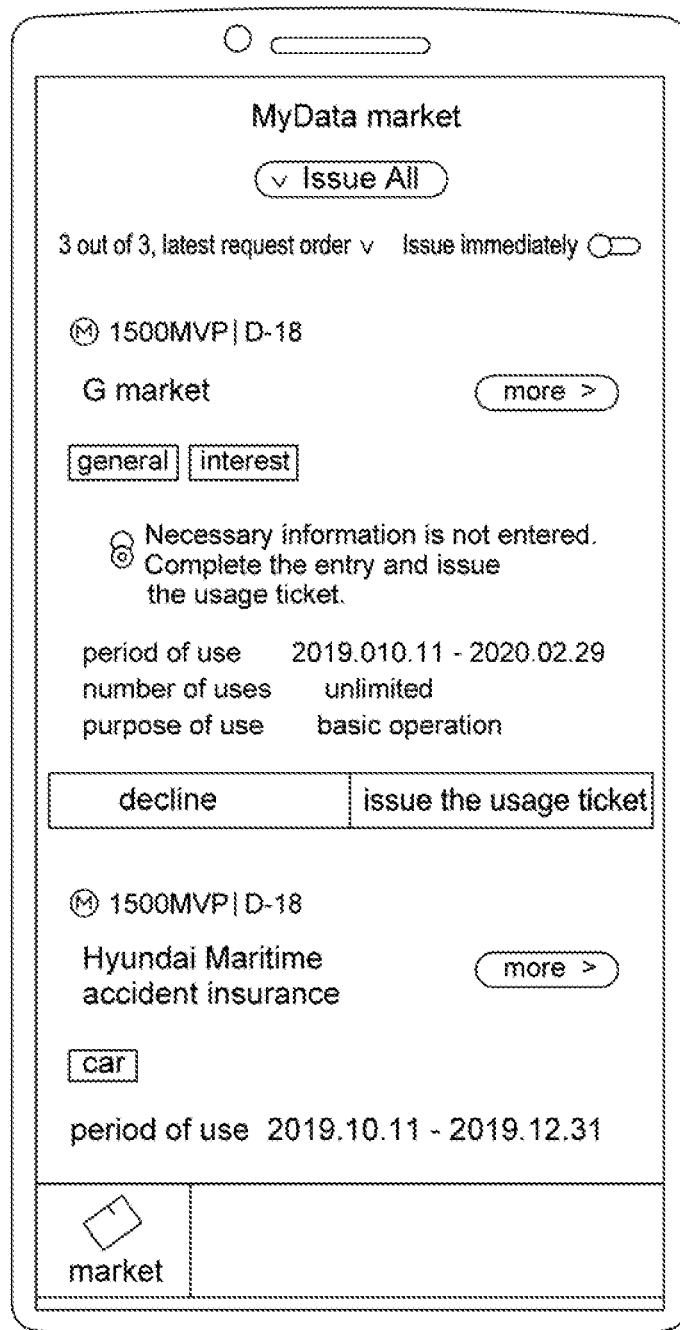
FIG. 10 illustrates an example of a usage right issuance screen for a personal information trade that is shown through execution of a personal information wallet application installed in a personal information management device that is implemented in a user terminal.

FIG. 10 illustrates an example of a usage right issuance screen for a personal information trade that is shown through execution of the personal information wallet application 100 installed in the personal information management device 10 that is implemented in a user terminal. Referring to FIG. 10, it may be appreciated from a usage right issuance screen that there are three usage right issuance requests received from service providers, G Market, Hyundai Marine & Fire Insurance, etc. G Market requests general personal information and interest information, and period of use, the number of times of use, and purpose of use are indicated. However, the corresponding personal information category is displayed in gray, indicating that the user has not input the necessary information, but when the input of the necessary information is completed, the corresponding personal information category may be converted into colors. The user may issue the corresponding usage right by pressing an issue button on the usage right issuance screen.

Figure 11:
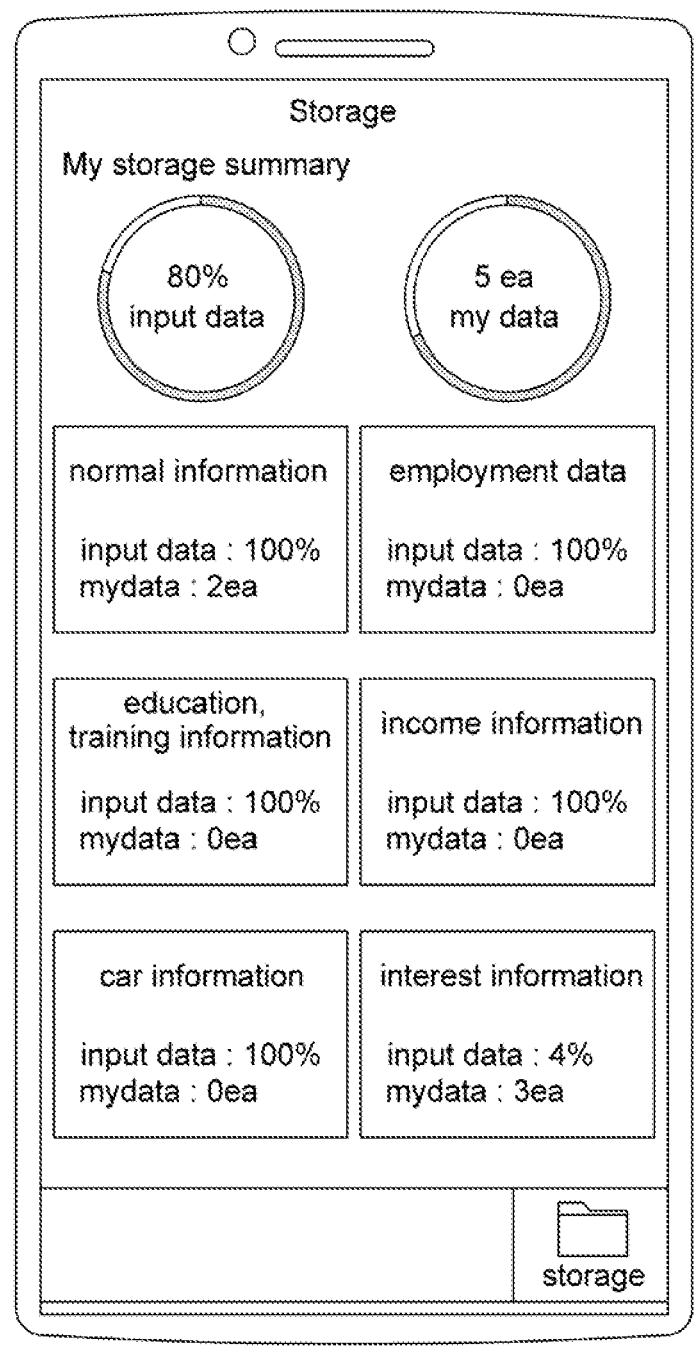
FIG. 11 illustrates an example of a screen for checking a personal information status that is shown through execution of a personal information wallet application installed in a personal information management device that is implemented in a user terminal.

FIG. 11 illustrates an example of a screen for checking a personal information status that is shown through execution of the personal information wallet application 100 installed in the personal information management device 10 that is implemented in a user terminal. Referring to FIG. 11, at the top of a status screen, it is displayed that personal information directly input by the user and personal information, MyData, retrieved from servers and/or databases of various service providers are stored in the personal information storage unit 200. Further, the personal information actually input by the user is currently 80% of the total personal information that may be input, and 5 units of information are stored as MyData.

At the bottom of the status screen, general information, employment information, education and training information, income information, vehicle information, and interest information are displayed as personal information categories, and a current amount of personal information input by the user and MyData is displayed. For example, it is indicated that the current user has input 100% of personal information of all other categories, but only 4% of interest information has been input, and instead, three units of information of MyData are stored. Accordingly, a horizontal bar displayed on the interest information category is colored as much as 4 with respect to the total of 100, so that an input amount of the interest information may be intuitively identified.

Figure 12:
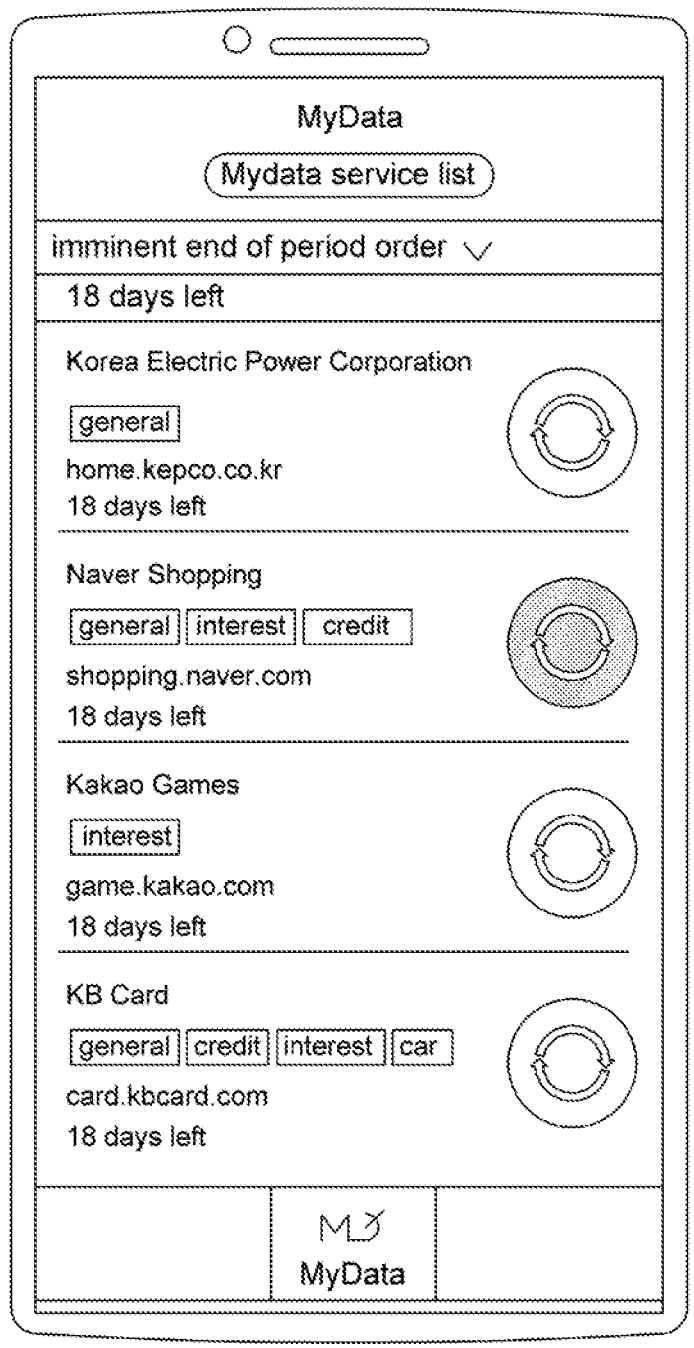
FIG. 12 illustrates an example of a screen for checking a MyData status that is shown through execution of a personal information wallet application installed in a personal information management device that is implemented in a user terminal.

FIG. 12 illustrates an example of a screen for checking a Mydata status that is shown through execution of a personal information wallet application installed in a personal information management device that is implemented in a user terminal. Referring to FIG. 12, a status screen shows a MyData service list in order of expire date. It shows a list of service providers who use or keep the user's personal information by utilizing the usage right and the remaining period of use of the usage right.

It also shows the category of personal information currently used by service providers. For example, it may be appreciated that Korea Electric Power Corporation (KEPCO) is using general personal information, Naver Shopping is using general personal information, interest information, and credit information, and Kakao Games is using interest information.

Meanwhile, blue/grey buttons on the right indicates that a personal information synchronization function is activated/deactivated. Personal information synchronization refers to a function of updating personal information that is created or managed by various service providers in real time. For example, the blue button indicates that the user's daily power consumption (energy consumption information) stored as MyData in KEPCO may be updated and the information is currently available to KEPCO.

Figure 13:
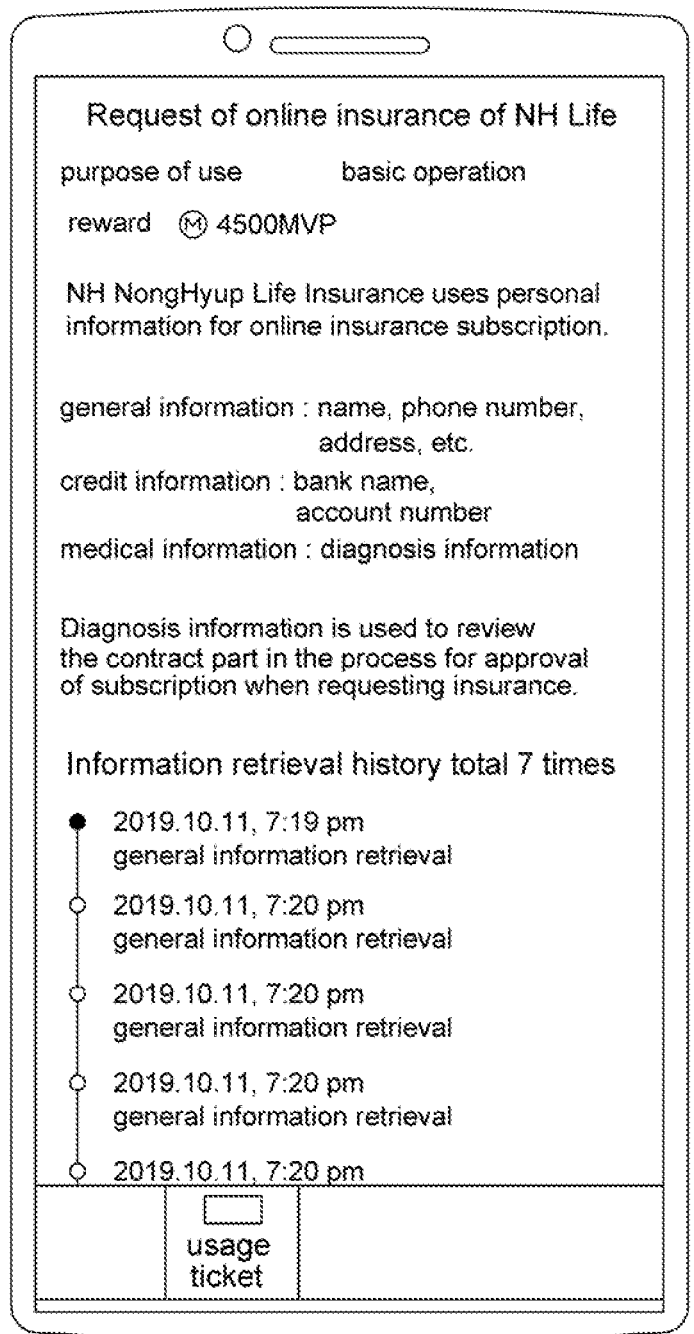
FIG. 13 illustrates an example of a screen for checking a status of usage by a service provider that is shown through execution of a personal information wallet application installed in a personal information management device that is implemented in a user terminal.

FIG. 13 illustrates an example of a screen for checking a status of usage by a service provider that is shown through execution of the personal information wallet application 100 installed in the personal information management device 10 that is implemented in a user terminal. Referring to FIG. 13, the status screen shows personal information contents, purpose of use, and use history of personal information used by NH Life, a service provider, for accepting a user's insurance plan. Through this, the user may identify that his or her personal information has been retrieved a total of seven times and may also know the retrieve timing of each inquiry.

As set forth hereinabove, according to one or more embodiments to the present disclosure, it is possible that individuals, the subject of information, may deliver personal information easily and securely to requesters of the personal information, while keeping the personal information under their own management, may manage their personal information more simply, and may actively control when and where and how their personal information is used. In addition, individuals may trade their personal information more efficiently by personally setting conditions of providing personal information and the level of providing personal information, and more effective protection may be achieved as well.

In addition, since personal information is kept by each individual and provided only when requested by a company, the burden on the company to manage personal information and/or to comply with the Personal Information Protection Act may be minimized. In addition, since a company is only provided with personal information of individuals who are willing to disclose their personal information, and based on the provided personal information, advertisements optimized for the provided personal information may be exposed to the individual who provided the personal information, the success rate of the advertisement may be increased to the maximum.

In addition, through blockchain-based smart contracts, personal information providers and personal information requesters may conduct fast and secure trades. Further, real-time characteristics and accuracy of personal information may be ensured, and contents of smart contracts, such as personal information categories, the number of times of use, purpose of use, and period of use, are transparently disclosed on the blockchain, and thus denial of the contracts of the personal-information trade parties may be prevented fundamentally, thus ensuring the stability of the trades.

The effects that may be obtained by the present disclosure are not limited to the above-described effects, and other effects that are not described above will be clearly understood by those skilled in the art based on the following description.

The foregoing detailed description describes some embodiments of the present disclosure. In addition, the foregoing description describes some preferred embodiments of the present disclosure, which may be used in various other combinations, modifications, and environments. That is, changes or modifications may be made within the scope of the concept of this disclosure, the scope equivalent to the embodiments described above, and/or the skills or knowledge known in the pertinent art. Therefore, the detailed description of the foregoing embodiments is not intended to limit the present disclosure to the disclosed embodiments. In addition, the appended claims should be construed to include other embodiments.

What is claimed is:

1. A portable electronic device, comprising:
    a storage with personal information of a user of the portable electronic device stored thereon;
    a display enabling touch interaction, wherein the touch interaction enables the user to set a usage permission range of personal information through a touch input, wherein the usage permission range of personal information comprises a) at least one of one or more categories of personal information or a level of personal information that is permitted to be used and b) one or more usage conditions on usage of the personal information; and
    a processor,
    wherein for a request from a service providing server through a blockchain network, the processor causes the personal information stored in the storage of the portable electronic device to be accessed within the portable electronic device for the service providing server in accordance with the usage permission range set by the user and causes customized service information corresponding to the accessed personal information to be displayed on the display, wherein the personal information stored in the storage of the portable electronic device is not shared with the blockchain network and is not exported out of the portable electronic device.

2. The portable electronic device of claim 1, wherein:
the processor enables a personal information request application residing on the portable electronic device to access the personal information in accordance with the usage permission range set by the user in response to the request from the service providing server through the blockchain network, and
the processor enables process service information provided from the service providing server to generate the customized service information.

3. The portable electronic device of claim 2, wherein:
program code for a personal information wallet application is stored in the storage, and
the processor is to execute the program code for the personal information wallet application so that the user of the portable electronic device sets the usage permission range through the user's touch interaction on the display with the personal information wallet application.

4. The portable electronic device of claim 1, wherein the processor is to transmit information about the usage permission range of the personal information to the blockchain network through a communication portion of the portable electronic device so that the usage permission range is recorded in the blockchain network.

5. The portable electronic device of claim 1, wherein:
the processor is to collect, through a communication portion of the portable electronic device, one or more personal information requests recorded in the blockchain network; and
the processor is to transmit to the blockchain network through the communication portion one or more approvals to be recorded in the blockchain network, the one or more approvals for use of the personal information in accordance with the usage permission range.

6. The portable electronic device of claim 1, wherein:
the usage permission range includes information related to a de-identification level of the personal information, and
the processor is to perform a de-identification operation on the personal information based on the de-identification level.

7. The portable electronic device of claim 1, wherein the processor is to create a smart contract including the one or more usage conditions of the personal information based on the usage permission range.

8. A computer-readable storage device stored with program code that, when executed by a portable electronic device provided with a touch screen display, causes the portable electronic device to perform a personal information management method, the personal information management method comprising:
enabling a user of the portable electronic device to set a usage permission range of personal information through touch interaction on the touch screen display with a personal information wallet application, wherein the usage permission range of personal information comprises at least one of one or more categories of personal information or a level of personal information that is permitted to be used;
for a request from a service providing server through a blockchain network, enabling the personal information stored in the portable electronic device to be accessed within the portable electronic device for the service providing server in accordance with the usage permission range; and
displaying, on the display, customized service information corresponding to the accessed personal information, wherein the personal information stored in a storage of the portable electronic device is not shared with the blockchain network and is not exported out of the portable electronic device.

9. The computer-readable storage device of claim 8, wherein enabling the personal information to be accessed in accordance with the usage permission range includes enabling a personal information request application residing on the portable electronic device to access the personal information stored in the portable electronic device in accordance with the usage permission range.

10. The computer-readable storage device of claim 8, wherein the personal information management method further comprises:
processing service information provided from the service providing server to generate the customized service information.

11. The computer-readable storage device of claim 8, wherein the personal information management method further comprises:
transmitting, through the personal information wallet application, information about the usage permission range of personal information to the blockchain network for the usage permission range to be recorded in the blockchain network, wherein the usage permission range further comprises one or more usage conditions on usage of the personal information.

12. The computer-readable storage device of claim 11, wherein the personal information management method further comprises:
collecting one or more personal information requests recorded in the blockchain network; and
transmitting to the blockchain network one or more approvals to be recorded in the blockchain network, the one or more approvals for use of the personal information in accordance with the usage permission range.

13. The computer-readable storage device of claim 8, wherein:
the usage permission range includes information related to a de-identification level of the personal information, and
processing service information provided from the service providing server to generate the customized service information includes performing a de-identification operation on the personal information based on the de-identification level.

14. The computer-readable storage device of claim 13, wherein the personal information management method further comprises:
creating a smart contract including usage conditions of the personal information based on the usage permission range.

15. The computer-readable storage device of claim 8, wherein the personal information management method further comprises:
measuring a risk level of how identifiable or inferable the user is; and
allowing or disallowing the personal information to be accessed based on the measured risk level.

16. A personal information management method, comprising:
receiving, from a user of a portable electronic device, a selection of a usage permission range of personal information through touch interaction on a touch screen display with a personal information wallet application, wherein the personal information is stored in the portable electronic device, and wherein the usage permission range of the personal information comprises at least one of one or more categories of personal information or a level of personal information that is permitted to be used;

receiving a request for personal information of the user from a service providing server through a blockchain network;

causing the personal information stored in the portable electronic device to be accessed within the portable electronic device for the service providing server in accordance with the usage permission range; and displaying, on the touch screen display, customized service information corresponding to the accessed personal information, wherein the personal information stored in a storage of the portable electronic device is not shared with the blockchain network and is not exported out of the portable electronic device.

17. The method of claim 16, wherein causing the personal information to be accessed in accordance with the usage permission range includes enabling a personal information request application residing on the portable electronic device to access the personal information stored in the portable electronic device in accordance with the usage permission range.

18. The method of claim 16, further comprising:
processing service information provided from the service providing server to generate the customized service information.

19. The method of claim 16, further comprising:
transmitting, through the personal information wallet application, information about the usage permission range of personal information to the blockchain network for the usage permission range to be recorded in the blockchain network, wherein the usage permission range further comprises one or more usage conditions on usage of the personal information.

20. The method of claim 16, further comprising:
collecting one or more personal information requests recorded in the blockchain network; and
transmitting to the blockchain network one or more approvals to be recorded in the blockchain network, the one or more approvals for use of the personal information in accordance with the usage permission range.

* * * * *